(12) United States Patent
Waters

(10) Patent No.: US 8,540,364 B2
(45) Date of Patent: Sep. 24, 2013

(54) LIGHTED GLASSES

(76) Inventor: Michael Waters, Aspen, CO (US)

( * ) Notice: Subject to any disclaimer, the term of this patent is extended or adjusted under 35 U.S.C. 154(b) by 0 days.

(21) Appl. No.: 13/232,691

(22) Filed: Sep. 14, 2011

(65) Prior Publication Data

US 2012/0062830 A1 Mar. 15, 2012

Related U.S. Application Data

(60) Provisional application No. 61/382,570, filed on Sep. 14, 2010.

(51) Int. Cl.
*G02C 1/00* (2006.01)

(52) U.S. Cl.
USPC ............................ 351/158; 351/126; 362/105

(58) Field of Classification Search
USPC .................. 351/158, 41, 124, 126, 128, 129; 362/419, 103, 105, 800, 492, 545, 546, 230, 362/234, 184, 185
See application file for complete search history.

(56) References Cited

U.S. PATENT DOCUMENTS

| | | | |
|---|---|---|---|
| 1,261,824 A | 1/1918 | La Vine | |
| 1,255,265 A | 2/1918 | Zachara | |
| 1,438,586 A | 12/1922 | Eaton | |
| 1,448,353 A | 3/1923 | Barany | |
| 1,572,210 A | 2/1926 | Kolibas | |
| 1,615,067 A | 1/1927 | Boerman | |
| 1,663,402 A * | 3/1928 | Engel ............................... | 351/65 |
| 1,879,512 A | 9/1932 | Rotea | |
| 2,196,543 A | 4/1940 | Anderson | |
| 2,461,254 A | 2/1949 | Bassett | |
| 2,531,585 A | 11/1950 | Pope | |
| 2,567,046 A | 9/1951 | Anderson | |
| 2,591,112 A | 4/1952 | Zwierzynski | |
| 2,638,532 A | 5/1953 | Brady | |
| 2,904,670 A | 9/1959 | Calmes | |
| 2,966,580 A | 12/1960 | Taylor | |
| 3,060,308 A | 10/1962 | Fortuna | |
| D207,919 S | 6/1967 | Fai | |

(Continued)

FOREIGN PATENT DOCUMENTS

| | | |
|---|---|---|
| CA | 2 466 175 A1 | 5/2003 |
| CA | 2608746 A1 | 11/2006 |

(Continued)

OTHER PUBLICATIONS

Website for ErgoDirect, Inc. "i4u Reading Lenses Credit Card Size Glasses" http://www.ergodirect.com/product_info.php?products_id=407#, accessed Apr. 14, 2010, (4 pages).

(Continued)

*Primary Examiner* — Hung Dang
(74) *Attorney, Agent, or Firm* — Fitch, Even, Tabin & Flannery, LLP

(57) ABSTRACT

Lighted glasses are provided that selectively project light forwardly of the glasses while also having a thin profile by avoiding the use of temple arms. The lighted glasses include a central light mount and a pair of lenses connected to the light mount by resilient arms. The arms allow a user to pull the lenses generally away from each other to fit on a wearer's nose. The light mount is configured to house a light assembly that includes a battery, a light source, and a switch to control operation of the light source.

15 Claims, 11 Drawing Sheets

(56) References Cited

U.S. PATENT DOCUMENTS

| | | |
|---|---|---|
| 3,350,552 A | 10/1967 | Lawrence |
| D215,751 S | 10/1969 | Castellano |
| 3,602,759 A | 8/1971 | Evans |
| 3,634,676 A | 1/1972 | Castellano |
| 3,647,059 A | 3/1972 | Humphreys |
| 3,683,168 A | 8/1972 | Tatje |
| 3,769,663 A | 11/1973 | Perl |
| D229,975 S | 1/1974 | Klugmann |
| 3,793,517 A | 2/1974 | Carlini |
| 4,210,952 A | 7/1980 | Ressmeyer |
| 4,254,451 A | 3/1981 | Cochran, Jr. |
| 4,283,127 A | 8/1981 | Rosenwinkel et al. |
| 4,332,007 A | 5/1982 | Gibstein et al. |
| 4,406,040 A | 9/1983 | Cannone |
| 4,462,064 A | 7/1984 | Schweitzer |
| 4,516,157 A | 5/1985 | Campbell |
| 4,541,698 A | 9/1985 | Lerner |
| 4,570,206 A | 2/1986 | Deutsch |
| 4,616,297 A | 10/1986 | Liu |
| 4,631,644 A | 12/1986 | Dannhauer |
| 4,774,643 A | 9/1988 | McGinnis et al. |
| 4,822,160 A | 4/1989 | Tsai |
| 4,822,161 A | 4/1989 | Jimmy |
| 4,902,119 A | 2/1990 | Porsche |
| 4,904,078 A | 2/1990 | Gorike |
| 4,959,760 A | 9/1990 | Wu |
| 4,963,045 A | 10/1990 | Willcox |
| 5,070,436 A | 12/1991 | Alexander et al. |
| 5,113,325 A | 5/1992 | Eisenbraun |
| 5,122,943 A | 6/1992 | Pugh |
| 5,140,220 A | 8/1992 | Hasegawa |
| 5,143,443 A | 9/1992 | Madsen |
| 5,158,356 A | 10/1992 | Guthrie |
| 5,164,749 A | 11/1992 | Shelton |
| 5,183,326 A | 2/1993 | Case |
| 5,189,512 A | 2/1993 | Cameron et al. |
| 5,218,385 A | 6/1993 | Lii |
| 5,230,558 A | 7/1993 | Jong |
| 5,245,516 A | 9/1993 | de Haas et al. |
| D343,470 S | 1/1994 | Yuen |
| 5,278,734 A | 1/1994 | Ferber |
| D349,123 S | 7/1994 | Cooley et al. |
| 5,331,333 A | 7/1994 | Tagawa et al. |
| 5,331,357 A | 7/1994 | Cooley et al. |
| 5,367,345 A | 11/1994 | da Silva |
| 5,438,698 A | 8/1995 | Burton et al. |
| 5,452,190 A | 9/1995 | Priesemuth |
| 5,460,346 A | 10/1995 | Hirsch |
| 5,485,358 A | 1/1996 | Chien |
| 5,541,767 A | 7/1996 | Murphy et al. |
| 5,541,816 A | 7/1996 | Miserendino |
| 5,546,099 A | 8/1996 | Quint et al. |
| D375,372 S | 11/1996 | Allen |
| 5,575,554 A | 11/1996 | Guritz |
| 5,606,743 A | 2/1997 | Vogt et al. |
| 5,608,808 A | 3/1997 | da Silva |
| 5,610,678 A | 3/1997 | Tsuboi et al. |
| D383,754 S | 9/1997 | Yuen |
| D383,863 S | 9/1997 | Yuen |
| 5,667,291 A | 9/1997 | Caplan et al. |
| 5,667,292 A | 9/1997 | Sabalvaro |
| D388,113 S | 12/1997 | Feinbloom |
| 5,708,449 A | 1/1998 | Heacock et al. |
| 5,722,762 A | 3/1998 | Soll |
| 5,741,060 A | 4/1998 | Johnson |
| 5,786,665 A | 7/1998 | Ohtsuki et al. |
| 5,806,961 A | 9/1998 | Dalton et al. |
| 5,836,673 A | 11/1998 | Lo |
| D405,901 S | 2/1999 | Feinbloom et al. |
| 5,871,271 A | 2/1999 | Chien |
| 5,893,631 A | 4/1999 | Padden |
| 5,918,966 A | 7/1999 | Arnold |
| 5,946,071 A | 8/1999 | Feldman |
| 5,997,165 A | 12/1999 | Lehrer |
| 6,005,536 A | 12/1999 | Beadles et al. |
| 6,012,822 A | 1/2000 | Robinson |
| 6,012,827 A | 1/2000 | Caplan et al. |
| D420,035 S | 2/2000 | Hartman |
| 6,056,413 A | 5/2000 | Urso |
| D428,431 S | 7/2000 | Jordan |
| 6,086,214 A | 7/2000 | Ridge |
| 6,172,657 B1 | 1/2001 | Kamakura et al. |
| 6,174,075 B1 | 1/2001 | Fuwausa |
| 6,206,543 B1 | 3/2001 | Henry |
| D445,928 S | 7/2001 | Sharrah et al. |
| D446,324 S | 8/2001 | Lynch et al. |
| 6,290,368 B1 | 9/2001 | Lehrer |
| 6,299,323 B1 | 10/2001 | Yu et al. |
| 6,302,570 B1 | 10/2001 | Petell et al. |
| 6,311,837 B1 | 11/2001 | Blaustein et al. |
| 6,320,822 B1 | 11/2001 | Okeya et al. |
| 6,367,949 B1 | 4/2002 | Pederson |
| D457,670 S | 5/2002 | Allen |
| 6,386,701 B1 | 5/2002 | Khulusi |
| 6,390,640 B1 | 5/2002 | Wong |
| 6,439,738 B1 | 8/2002 | Matthews et al. |
| 6,457,838 B1 | 10/2002 | Dugmore et al. |
| 6,461,025 B1 | 10/2002 | Payne |
| 6,474,830 B1 | 11/2002 | Hansen |
| D469,198 S | 1/2003 | Olson |
| 6,504,099 B2 | 1/2003 | Huang |
| 6,523,973 B2 | 2/2003 | Galli |
| 6,530,672 B2 | 3/2003 | Galli |
| D473,890 S | 4/2003 | Waters |
| 6,549,231 B1 | 4/2003 | Matsui |
| 6,554,444 B2 | 4/2003 | Shimada et al. |
| D477,432 S | 7/2003 | Parsons |
| 6,604,837 B2 | 8/2003 | Sandberg |
| 6,612,695 B2 | 9/2003 | Waters |
| 6,612,696 B2 | 9/2003 | Waters |
| D484,905 S | 1/2004 | Waters |
| 6,713,956 B2 | 3/2004 | Chen |
| 6,749,166 B2 | 6/2004 | Valentine et al. |
| 6,764,194 B1 | 7/2004 | Cooper |
| 6,802,636 B1 | 10/2004 | Bailey, Jr. |
| 6,808,284 B1 | 10/2004 | Chao |
| 6,824,265 B1 | 11/2004 | Harper |
| 6,830,357 B2 | 12/2004 | Lopez |
| D501,266 S | 1/2005 | Harris et al. |
| 6,857,739 B1 | 2/2005 | Watson |
| 6,860,628 B2 | 3/2005 | Robertson |
| 6,863,416 B2 | 3/2005 | Waters |
| D507,368 S | 7/2005 | Waters |
| D507,369 S | 7/2005 | Waters |
| 6,929,878 B2 | 8/2005 | Chen et al. |
| 6,966,668 B2 | 11/2005 | Cugini et al. |
| 6,977,776 B2 | 12/2005 | Volkenandt et al. |
| 6,993,803 B2 | 2/2006 | Chan |
| 6,997,552 B1 | 2/2006 | Hung |
| 7,003,353 B1 | 2/2006 | Parkhouse |
| 7,004,582 B2 | 2/2006 | Jannard et al. |
| 7,008,074 B1 | 3/2006 | Halm |
| 7,021,790 B2 | 4/2006 | Parsons |
| 7,094,981 B2 | 8/2006 | Sorrentino et al. |
| 7,104,670 B2 | 9/2006 | Waters |
| 7,105,939 B2 | 9/2006 | Bednyak |
| 7,111,956 B2 | 9/2006 | Brown |
| 7,118,241 B2 | 10/2006 | Sohn |
| 7,118,262 B2 | 10/2006 | Negley |
| 7,147,324 B2 | 12/2006 | Jannard et al. |
| 7,150,526 B2 | 12/2006 | Jannard et al. |
| 7,213,917 B2 | 5/2007 | Jannard et al. |
| 7,216,973 B2 | 5/2007 | Jannard et al. |
| 7,226,180 B2 | 6/2007 | Sung |
| 7,234,831 B1 | 6/2007 | Hanley |
| 7,255,437 B2 | 8/2007 | Howell et al. |
| 7,264,350 B2 | 9/2007 | Jannard et al. |
| D553,177 S | 10/2007 | Chen |
| 7,278,734 B2 | 10/2007 | Jannard et al. |
| 7,281,826 B2 | 10/2007 | Huang |
| D568,922 S | 5/2008 | Anderl |
| 7,377,664 B2 | 5/2008 | Waters |
| 7,422,324 B2 | 9/2008 | Lee |
| 7,438,409 B2 | 10/2008 | Jordan |

| | | |
|---|---|---|
| 7,562,979 B2 | 7/2009 | Waters |
| D600,738 S | 9/2009 | Su et al. |
| 7,607,775 B2 | 10/2009 | Hermanson et al. |
| 7,661,818 B2 | 2/2010 | Waters |
| D611,086 S | 3/2010 | Meng-Suen |
| 7,699,486 B1 | 4/2010 | Beiner |
| D617,826 S | 6/2010 | Waters |
| 7,862,979 B2 | 1/2011 | Morris et al. |
| 7,938,553 B1 | 5/2011 | Beiner |
| 7,942,522 B2 | 5/2011 | Sonsino |
| 7,946,705 B1 | 5/2011 | Hsu |
| 8,007,101 B1 | 8/2011 | Wang |
| 8,152,330 B2 | 4/2012 | Waters |
| 8,235,524 B2 | 8/2012 | Waters |
| 2002/0131275 A1 | 9/2002 | Yamamoto et al. |
| 2002/0163800 A1 | 11/2002 | Hansen |
| 2002/0186557 A1 | 12/2002 | Lary et al. |
| 2002/0187806 A1 | 12/2002 | Jang |
| 2003/0079387 A1 | 5/2003 | Derose |
| 2003/0086053 A1 | 5/2003 | Waters |
| 2003/0086054 A1 | 5/2003 | Waters |
| 2003/0169207 A1 | 9/2003 | Beigel |
| 2003/0189824 A1 | 10/2003 | Meeder et al. |
| 2003/0206269 A1 | 11/2003 | Waters |
| 2004/0222638 A1 | 11/2004 | Bednyak |
| 2004/0240067 A1 | 12/2004 | Marusi et al. |
| 2004/0240204 A1 | 12/2004 | Russ et al. |
| 2004/0264176 A1 | 12/2004 | Vanderschuit |
| 2005/0001433 A1 | 1/2005 | Seelin |
| 2005/0072458 A1 | 4/2005 | Goldstein |
| 2005/0099799 A1 | 5/2005 | Cugini et al. |
| 2005/0204490 A1 | 9/2005 | Kemp et al. |
| 2005/0211187 A1 | 9/2005 | Harman et al. |
| 2005/0248932 A1 | 11/2005 | Waters |
| 2005/0254238 A1 | 11/2005 | Parker et al. |
| 2005/0265015 A1 | 12/2005 | Salazar |
| 2006/0012974 A1 | 1/2006 | Su |
| 2006/0012975 A1 | 1/2006 | Huttner et al. |
| 2006/0091784 A1 | 5/2006 | Conner et al. |
| 2006/0092621 A1 | 5/2006 | Lai |
| 2006/0138440 A1 | 6/2006 | Jyo |
| 2006/0158895 A1 | 7/2006 | Brands et al. |
| 2006/0197905 A1 | 9/2006 | Lu |
| 2006/0198122 A1 | 9/2006 | Senter et al. |
| 2006/0232239 A1 | 10/2006 | Maglica et al. |
| 2006/0238995 A1 | 10/2006 | Wang |
| 2006/0239018 A1 | 10/2006 | Jardin |
| 2006/0291193 A1 | 12/2006 | Hill |
| 2007/0013865 A1 | 1/2007 | Joradn |
| 2007/0030442 A1 | 2/2007 | Howell et al. |
| 2007/0053179 A1 | 3/2007 | Pang et al. |
| 2007/0058361 A1 | 3/2007 | Sevilla |
| 2007/0074752 A1 | 4/2007 | Shau et al. |
| 2007/0127250 A1 | 6/2007 | Waters |
| 2007/0145746 A1 | 6/2007 | Biamonte |
| 2007/0153500 A1 | 7/2007 | Waters |
| 2007/0153537 A1 | 7/2007 | Scott et al. |
| 2007/0159810 A1 | 7/2007 | Kim |
| 2007/0159823 A1 | 7/2007 | Ho et al. |
| 2007/0189003 A1 | 8/2007 | Daley |
| 2007/0206373 A1 | 9/2007 | Whiteside et al. |
| 2007/0236649 A1 | 10/2007 | Lin |
| 2007/0236915 A1 | 10/2007 | Chen |
| 2007/0236916 A1 | 10/2007 | Hsu |
| 2008/0069391 A1 | 3/2008 | Steyn et al. |
| 2008/0130272 A1 | 6/2008 | Waters |
| 2009/0190026 A1 | 7/2009 | Chen |
| 2009/0213323 A1 | 8/2009 | Hermanson et al. |
| 2010/0134761 A1 | 6/2010 | Johns et al. |
| 2010/0182563 A1 | 7/2010 | Waters |
| 2011/0013135 A1 | 1/2011 | Waters |
| 2011/0075095 A1 | 3/2011 | Waters |
| 2011/0187989 A1 | 8/2011 | Waters |
| 2011/0211156 A1 | 9/2011 | Beiner |
| 2011/0228211 A1 | 9/2011 | Waters |
| 2012/0155064 A1 | 6/2012 | Waters |

FOREIGN PATENT DOCUMENTS

| | | |
|---|---|---|
| CA | 2610073 A1 | 5/2008 |
| CN | 1603677 A | 4/2005 |
| CN | 2826472 Y | 10/2006 |
| CN | 201548769 U | 8/2010 |
| CN | 101950091 A | 1/2011 |
| CN | 201707513 U | 1/2011 |
| CN | 301445845 S | 1/2011 |
| CN | 201796205 U | 4/2011 |
| DE | 3043007 | 6/1982 |
| DE | 9410886 | 9/1994 |
| EP | 1451633 | 9/2004 |
| EP | 2 290 433 A1 | 3/2011 |
| EP | 2 299 311 A1 | 3/2011 |
| EP | 2 350 734 | 8/2011 |
| GB | 2272073 A | 5/1994 |
| JP | 2004-207580 A | 7/2004 |
| WO | 01/13033 A1 | 2/2001 |
| WO | 01/77575 A1 | 10/2001 |
| WO | 03/040808 | 5/2003 |
| WO | 2006/124928 A1 | 11/2006 |
| WO | 2007/058706 A2 | 5/2007 |
| WO | 2011/041591 A1 | 4/2011 |
| WO | 2011/100471 A1 | 8/2011 |
| ZA | 2004/3826 A | 9/2005 |

OTHER PUBLICATIONS

Docket report of *Waters Industries, Inc. v. Mr. Christmas Incorporated, et al.*, United States District Court for the Northern District of Illinois, Case No. 1:09-cv-07577, filed Dec. 7, 2009, 5 pages.

"Complaint", *Waters Industries, Inc. v. Mr. Christmas Incorporated, et al.*, United States District Court for the Northern District of Illinois, Case No. 1:09-cv-07577, 38 pages.

Docket report of *Waters Industries, Inc. v. The Gerson Company*, United States District Court for the Northern District of Illinois, Case No. 1:10-cv-01865, filed Mar. 24, 2010, 3 pages.

"Complaint", *Waters Industries, Inc. v. The Gerson Company*, United States District Court for the Northern District of Illinois, Case No. 1:10-cv-01865,71 pages.

Docket report of *Waters Industries, Inc. v. Sweet Baby, Inc. dba AJ Morgan et al.*, United States District Court for the Northern District of Illinois, Case No. 1:09-cv-07595, filed Dec. 7, 2009, 7 pages.

"Complaint", *Waters Industries, Inc. v. Sweet Baby, Inc. dba AJ Morgan et al.*, United States District Court for the Northern District of Illinois, Case No. 1:09-cv-07595, 78 pages.

"Answer to Complaint, Counterclaims", filed by Sweet Baby, Inc. dba AJ Morgan, *Waters Industries, Inc. v. Sweet Baby, Inc. dba AJ Morgan et al.*, United States District Court for the Northern District of Illinois, Case No. 1:09-cv-07595, 15 pages.

"Answer to Complaint, Counterclaims", filed by Lilian Vernon Corporation,*Waters Industries, Inc. v. Sweet Baby, Inc. dba AJ Morgan et al.*, United States District Court for the Northern District of Illinois, Case No. 1:09-cv-07595, 15 pages (Feb. 4, 2010).

Docket report of *Waters Industries, Inc. v. Kikkerland Design, Inc.*, United States District Court for the Northern District of Illinois, Case No. 1:10-cv-04076, filed Jun. 30, 2010, 4 pages.

"Complaint", *Waters Industries, Inc. v. Kikkerland Design, Inc.*, United States District Court for the Northern District of Illinois, Case No. 1:10-cv-04076, 21 pages (Jun. 30, 2010).

"Kikkerland Design, Inc.'s Answer to Complaint, Affirmative Defenses and Counterclaim", *Waters Industries, Inc. v. Kikkerland Design, Inc.*, United States District Court for the Northern District of Illinois, Case No. 1:10-cv-04076, 12 pages (Aug. 6, 2010).

"Complaint" with Exhibit A through D, *Waters Industries, Inc. v. JJI International, Inc., et al.*, United States District Court for the Northern District of Illinois, Case No. 1:11-cv-03791, 73 pages (Document No. 1, Jun. 3, 2011).

"Defendants' Answer and Counterclaim" and "Responses to Specific Allegations", *Waters Industries, Inc. v. JJI International, Inc. and Stein Mart, Inc.*, United States District Court for the Northern District of Illinois, Case No. 1:11-cv-03791, 16 pages (Document No. 15, Jun. 28, 2011).

"Plaintiffs Initial Infringement Contentions Under Local Patent Rule 2.2" with Appendix A through F, *Waters Industries, Inc. v. JJI Inter-*

*national, Inc. and Stein Mart, Inc.*, United States District Court for the Northern District of Illinois, Case No. 1:11-cv-03791, 44 pages (Jul. 26, 2011).
"Defendants' Initial Non-Infringement and Invalidity Contentions" with Appendix A though G, *Waters Industries, Inc. v. JJI International, Inc. and Stein Mart, Inc.*, United States District Court for the Northern District of Illinois, Case No. 1:11-cv-03791, 78 pages (Aug. 9, 2011).
"Plantiff's Initial Response to Invalidity Contentions Under Local Patent Rule 2.5" with Appendix A and B, *Waters Industries, Inc. v. JJI International, Inc. and Stein Mart, Inc.*, United States District Court for the Northern District of Illinois, Case No. 1:11-cv-03791, 29 pages (Aug. 23, 2011).
"Defendants' Final Invalidity Contentions" with Appendix A though D, *Waters Industries, Inc. v. JJI International, Inc. and Stein Mart, Inc.*, United States District Court for the Northern District of Illinois, Case No. 1:11-cv-03791, 33 pages (Feb. 21, 2012).
"Plaintiffs Final Infringement Contentions Under Local Patent Rule 3.1" with Appendix A though F, *Waters Industries, Inc. v. JJI International, Inc. and Stein Mart, Inc.*, United States District Court for the Northern District of Illinois, Case No. 1:11-cv-03791, 58 pages (Feb. 21, 2012).
"Plaintiffs Response to Defendants' Final Invalidity Contentions Under Local Patent Rule 3.2" with Appendix A though D-4, *Waters Industries, Inc. v. JJI International, Inc. and Stein Mart, Inc.*, United States District Court for the Northern District of Illinois, Case No. 1:11-cv-03791, 73 pages (Mar. 19, 2012).
"Complaint", *Waters Industries, Inc. v. JJI International, Inc.*, United States District Court of the Northern District of Illinois, Case No. 1:12-cv-06195, 4 pages (Aug. 7, 2012).
"Defendant's Answer, Affirmative Defenses and Counterclaim", *Waters Industries, Inc. v. JJI International, Inc.*, United States District Court of the Northern District of Illinois, Case No. 1:12-cv-06195, 9 pages (Sep. 4, 2012).
"Plaintiff's Answer to Defendant's Counterclaims", *Waters Industries, Inc. v. JJI International, Inc.*, United States District Court of the Northern District of Illinois, Case No. 1:12-cv-06195, 4 pages (Sep. 28, 2012).
"Plaintiffs Initial Infringement Contentions Under Local Patent Rule 2.2" with Appendix A through B, *Waters Industries, Inc. v. JJI International, Inc.*, United States District Court of the Northern District of Illinois, Case No. 1:12-cv-06195, 30 pages (Oct. 2, 2012).
"Defendant's Initial Non-Infringement and Invailidity Contentions" with Appendix A through B and Figure D1, *Waters Industries, Inc. v. JJI International, Inc.*, United States District Court of the Northern District of Illinois, Case No. 1:12-cv-06195, 31 pages (Oct. 16, 2012).
Office Action issued in related Canadian Application No. 2,466,175 dated Sep. 22, 2010 (3 pages).
Supplementary European search report issued in the related European Application No. 02 77 8755 dated Jan. 19, 2005 (2 pages).
Office Action issued in related European Application No. 02 778 755.5 dated Feb. 20, 2007 (7 pages).
Extended European search report issued in the related European Application No. 10 18 1592.6 dated Jan. 31, 2011 (7 pages).
Extended European search report issued in the related European Application No. 10 18 1593.4 dated Feb. 1, 2011 (8 pages).
International Search Report from the International Bureau of WIPO issued in the related International Application No. PCT/US02/35665, dated Jun. 27, 2003, 1 page.
Written Opinion of the International Searching Authority and International Search Report from the International Bureau of WIPO for International Application No. PCT/US2006/018968, dated Oct. 16, 2006, 7 pages.
Notification of Transmittal of the International Search Report and the Written Opinion of the International Searching Authority, or the Declaration from the International Bureau of WIPO for International Application No. PCT/US10/50978, dated Dec. 3, 2010, 16 pages.
Notification of Transmittal of the International Search Report and the Written Opinion of the International Searching Authority, or the Declaration from the International Bureau of WIPO for International Application No. PCT/US2011/024400, dated Apr. 29, 2011, 13 pages.
Notification of Transmittal of the International Search Report and the Written Opinion of the International Searching Authority, or the Declaration from the International Bureau of WIPO for International Application No. PCT/US2011/051596, dated Jan. 18, 2012, 9 pages.

* cited by examiner

LIGHTED GLASSES

CROSS-REFERENCE TO RELATED APPLICATION

This application claims the benefit of U.S. Provisional Application No. 61/382,570, filed Sep. 14, 2010, which is hereby incorporated herein by reference in its entirety.

FIELD OF THE INVENTION

The field relates to hands-free lighting devices and, in particular, to lighted glasses capable of providing illumination for a wearer.

BACKGROUND OF THE INVENTION

Often an individual desires a light source to illuminate an area while performing a task or a light source directed in a general outward direction for visibility. Holding a flashlight is an option, but such lighting devices are often cumbersome and may detract from the task being completed because the flashlight must be held. As a result, hands-free lighting is often used because the individual desiring illumination does not need to hold the light source. Common types of hands-free lighting include light sources mounted to headgear or eyeglasses.

Light sources on eyeglasses usually include mounting arrangements of the light source, which may be an LED, on either the cross-frame or temple of the eyeglass so as to provide illumination forwardly of the wearer. In such configuration, lighted eyeglasses are typically used to provide directed or focused light so that an area immediately forward of the wearer, e.g., 6-24 inches from their eyes, can be illuminated for tasks such as reading typical sized print. For other activities, such as walking at night, camping or emergency use, lighting areas even further ahead of the individual may be desirable. However, prior lighted glasses configured to provide hands-free lighting can be heavy, bulky, inconvenient, and/or otherwise provide unsatisfactory performance. For example, some prior lighted glasses have separate and bulky lighting modules fastened to the glasses such as those disclosed in U.S. Pat. No. 5,541,767 to Murphy et al.; U.S. Pat. No. 4,959,760 to Wu; and U.S. Pat. No. 3,769,663 to Perl. Because of their large lighting modules, these glasses are bulky and may be relatively heavy making them inconvenient for a user to wear or carry.

SUMMARY OF THE INVENTION

Lighted glasses are described herein that selectively project light forwardly of the glasses. In one form, the glasses are configured to grip a nose of a wearer to avoid the use of temple arm members and provide lighted glasses with a thin profile. Lenses of the glasses may include resilient arm members to allow a user to pull the lenses generally away from each other to flex the arm members and fit the glasses on their nose. Upon release of the lenses, the arm members resiliently return toward their undeformed or unflexed configuration shifting back toward each other to clamp on the wearer's nose. The glasses additionally include a light source electrically connected to a battery. Preferably, the light source and the battery are received within a housing that is generally centrally disposed between the lenses. So disposed, the lenses can be attached to the housing, such as through the resilient arm members. By one approach, the glasses are constructed with a single, unitary main member that includes the lenses, resilient arms, and a base portion of the light source housing.

A cover is provided to couple with the base portion to enclose the light source, battery, and electrical connections in the housing. Alternatively, a spring steel or the like can attach the lenses to the housing and provide the resilient flexure described above. By one approach, the spring steel can have a central portion attached to or fed through the housing and distal ends embedded within the lenses to secure the lenses to the housing.

The lighted glasses can utilize a rotary switch to selectively control power provided to the light source. In one form, the light source includes two electrical contacts that project therefrom. The battery has a disc configuration with an annular side surface between opposite substantially flat main faces or surfaces. One contact is configured to selectively electrically connect with a side surface of the battery as by engagement therewith and the other contact is configured to electrically connect with an oppositely charged face of the battery via engagement therewith. The rotary switch is operable to shift the one contact into and out from engagement with the battery side surface to selectively energize the light source.

The rotary switch has an arcuate arm that is sized to grip and secure the battery thereto to be rotated therewith. In this form, the face contact is continuously in electrical engagement with the face of the battery and the side contact is configured to be biased into engagement with the battery side surface. Advantageously, the side contact can include an inclined cam surface that is operable to be selectively engaged by the switch arm so that the rotational movement of the switch arm cams the side contact away from the battery side surface to disengage the contact therefrom. By one approach, the switch arm includes a narrow end segment that engages the inclined cam surface so that during rotation of the switch arm, the narrow end segment slides along the inclined cam surface to shift the contact away from engagement with the battery side surface for positioning the rotary switch in the "off" configuration. Then, when light is desired, the arm can be rotated in the opposite rotational direction toward its "on" position. Because the side contact is biased toward the battery side surface, when the arm is rotated sufficiently so that the distal end thereof clears the cam surface of the side contact so as to no longer be in engagement therewith, the side contact shifts into engagement with the battery side surface to position the rotary switch in the "on" configuration.

In another form, the side contact is in continuous electrical engagement with the battery and the face contact continuously engages the battery main surface, but is configured to be shifted for selectively engaging an electrical contact of the light source. The rotary switch is configured to rotate the face contact between "on" and "off" positions in and out of engagement with the light source contact to energize the light source. In this form, the face contact is fixedly secured to a rotary cover of the housing. So secured, when the cover is rotated, the face contact is also rotated. The face contact can be rotated into and out of electrical contact with the light source contact so that the light source can be selectively energized.

As will be appreciated, the rotary switches described above can have other uses besides with the lighted glasses described herein. For example, other lighted headgear, such as hats, may have the rotary switch incorporated therewith for operating the lights thereof.

Alternatively, the lighted glasses can utilize a slide switch having a base portion received within the housing and an actuator portion projecting outwardly of the housing for actuation by a user of the glasses. The rotary switch configurations discussed above utilize shifting of a light source contact in and out of resilient engagement with the battery or providing a battery contact that is rotated to shift in and out of contact with one of the light source contacts. With the slide switch, however, the slide switch controls operation of the light source, so the electrical connections coupling the switch, the light source, and the battery can be disposed in relatively permanent positions in the light mount without the need for shifting.

DETAILED DESCRIPTION OF THE PREFERRED EMBODIMENTS

Figure 1:
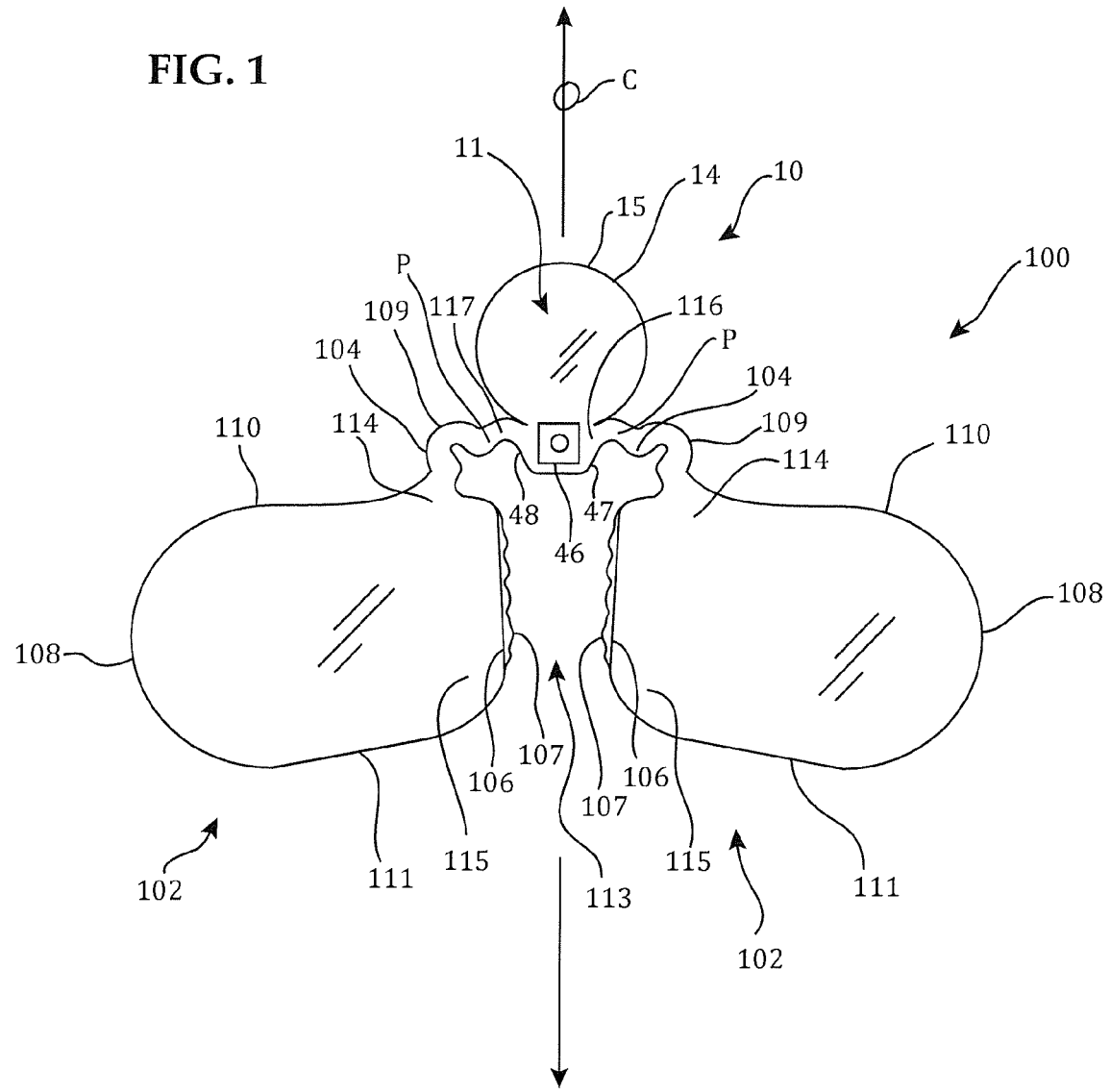
FIG. 1 is a front elevation view of lighted nose clamp glasses having lenses and a centrally located housing for the light components.

As shown in FIG. 1, lighted glasses in the form of nose-clamp glasses 100 are shown with a generally centrally mounted light mount 10 including a housing assembly 14 having a battery compartment 11 and an adjoining light compartment 48 for light source 46. The light source is located generally between a pair of lenses 102. The glasses 100 are templeless and, thus, worn without the need for temple arms by securing to the nose of a wearer using a biasing force between the lenses 102. The glasses 100 are advantageous because they are small and compact and with a thin profile slightly thicker than the thickness of a credit card. The glasses 100 may therefore easily fit in the credit card slot in a wallet or purse.

As shown, the glasses 100 include the pair of lenses 102 with each lens 102 generally positioned on opposite sides of the central light mount 10. Each lens 102 may be attached to the central light mount 10 by resilient arm members 104 that allow the pair of lenses 102 to be resiliently shifted away from each other for being fit on the wearer's nose with the arms 104 biasing the lenses into secure engagement with either side of the wearer's nose, in effect clamping the nose between the lenses 102.

As illustrated, each lens 102 includes a rounded distal outer edge 108 with top and bottom edges 110, 111 extending between the top and bottom of the outer edge 108 to the top and bottom of a generally flat, inner nose engagement edge 106. By one approach, the distance between the top and bottom edges 110, 111 adjacent to the rounded distal end 108 is greater than the distance between the top and bottom edges 110, 111 adjacent to the engagement edge 106, such that the top and bottom edges 110, 111 taper inwardly toward each other. Each resilient arm member 104 is connected to the lens 102 along the top edge 110 adjacent the inner engagement edge 106 at lens upper corner portion 114. As shown, the resilient arm members 104 position the lenses 102 so that the engagement edges 106 are spaced to form a gap 113 therebetween. In an unflexed configuration, the resilient arm members 104 hold the lenses 102 such that the engagement edges 106 are generally parallel or slightly taper downwardly toward each other. So configured, the gap has a generally rectangular or upwardly opening wedge-shaped configuration when the resilient arm members 104 are unflexed. The lenses 102 may be configured to provide vision correction, eye protection, protection from ultraviolet (UV) rays, or the like. The vision correction and UV protection properties may span the entire area of the lenses 102 or, alternatively, can be included on a smaller portion thereof.

In order to secure to a wearer's nose, the lenses 102 are normally spaced fairly close together, e.g. approximately between about 1 mm and about 15 mm when in the unflexed configuration, and preferably between about 5 mm and 12 mm, which requires the user to shift the lenses 102 apart for fitting on his/her nose with the resilient arm members 104 generating a bias force to urge the lenses 102 back toward each other biasing them inwardly so that the engagement edges 106 may grip opposite sides of a wearer's nose. As the user shifts the lenses 102 away from one another, the lenses 102 pivot with respect to the resilient arm members 104 such that the lens upper corner portions 114 are shifted away from each other a shorter distance than lower inner corner portions 115 due to the pivoting action between the lenses 102. In this shifted and pivoted configuration, the engagement edges 106 will now have a reverse taper so that they taper downwardly away from each other. In this flexed position, the gap 113 has a downwardly opening wedge-shaped configuration that generally conforms to the shape of a user's nose. To aid in gripping the nose, the engagement edges 106 may include surface features 107 such as undulations, ribs, or the like to enhance their grip. Alternatively, the engagement edges 106 may include a curved or rounded shape to more closely conform to a wearer's nose.

The resilient arm members 104 connecting the lenses 102 to the central light mount 10 can be of spring steel, plastic, polycarbonate, or other suitable resilient materials. As shown, the resilient arm members 104 include a thin, elongate strip extending between an upper, inner corner 114 of the lenses 102 and lower side portions 116 of the light mount 10 so that the light mount 10 is positioned above and intermediate of the lenses 102. In addition, the light mount 10 is preferably disposed generally centrally between the lenses 102 so as to be positioned along central axis C extending between the lenses 102 in gap 113 and centrally through the light mount 10.

In the illustrated form of FIG. 1, the strip-shaped arm members 104 include a convex arcuate portion 109 that curves outwardly intermediate of the lens upper side portion 114 and the light mount lower side portion 116 and away from the gap 113 between the lenses 102. The arcuate portion 109 can provide a greater range or amount of resilient flexure of the biased resilient arm members 104 to allow the lenses 102 to be pulled farther apart from each other over an otherwise linear member as the lenses 102. For example, the arcuate portion 109 is configured to have a relatively small radius, e.g., approximately 1 mm, when the glasses 100 are in a relaxed, normal or unbiased configuration. Then, as the lenses 102 are forced generally apart, the resilient arm members 104 flex and the arcuate portions 109 can progressively expand so that the radius thereof increases. Once a desired expanded width of the gap 113 is achieved between the lenses 102, a user can position the lenses 102 on either side of his/her nose and allow the resilient arms to contract to draw the lenses 102 back toward each other, reducing the width of the gap 113 therebetween until the edges 106 are in engagement with the corresponding sides of the wearer's nose. It is contemplated that a user's nose generally will have a width greater than that across the gap 113 in the unflexed configuration, so that the engagement edges 106 can engage the user's nose with the radii of the flexed arcuate portions 109 being larger than the relaxed, tight radius so that the lenses 102 are biased against and clamp on to the user's nose.

The nose clamp glasses 100 can have a thin construction with a thickness of less than about 5 mm and preferably having a maximum thickness of about 4 mm, and more preferably about 2-3 mm. As discussed further below, the thin construction is possible, in part, through the use of a surface mount LED for the light source 46 that does not add to the thickness of the glasses 100. Additionally, the lenses 102, the resilient arm members 104, and base portion 15 of the light mount 10 can be molded as a single, unitary component. The single piece construction can further have a generally uniform thin profile or depth so that the glasses 100 have a generally flat or planar configuration. So configured, the nose clamp glasses 100 with the light mount 10 and the light source 46 attached thereto can be stored within a thin profile receptacle, such as a credit card slot in a wallet, purse, or the like. Due to this, when glasses are desired or needed, the glasses 100 are conveniently on hand. Advantageously, the glasses 100 further provide an easy to use light mount 10. A user grips the lenses 102 and pulls the lenses 102 generally apart to resiliently deform the resilient arm members 104. The user then allows the nose engagement surfaces 106 to shift into contact with their nose and releases the lenses 102 so that the resilient arm members 104 cause the nose engagement surfaces 106 to be engaged tightly against both sides of the user's nose. The user can then activate the light source 46 in the light mount 10 to provide light forwardly of the user, such as to a reading or viewing area.

Figure 2:
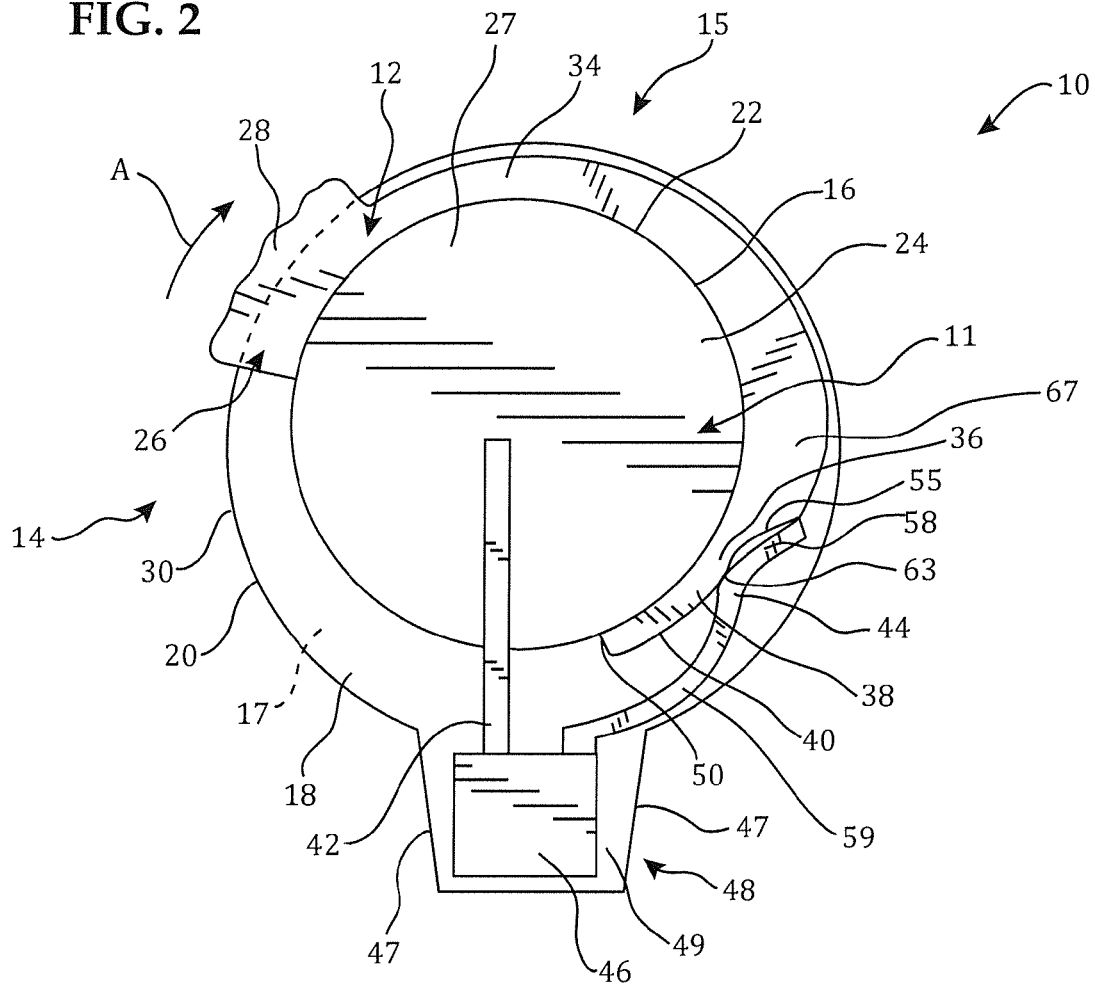
FIG. 2 is a front elevation view of a battery and light housing with a battery and light source therein and a rotary switch shown rotated to an "off" position.
Figure 3:
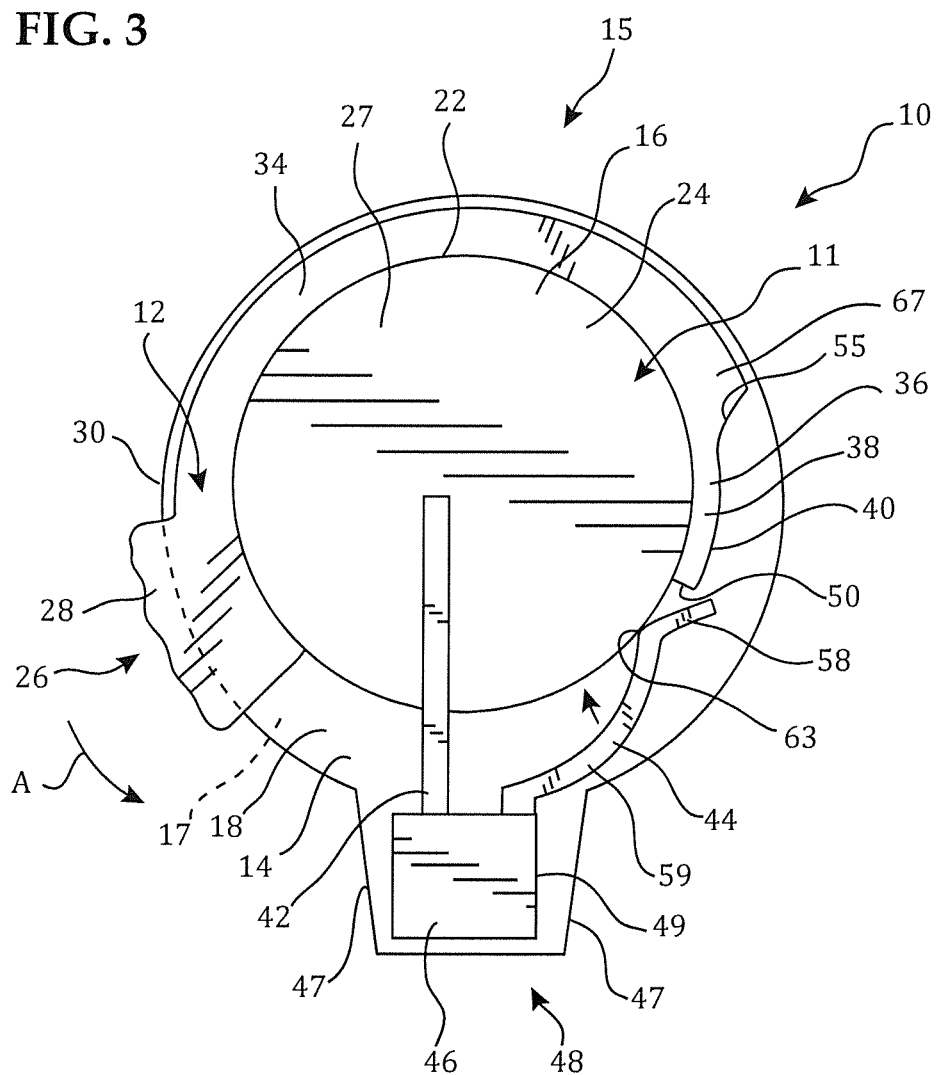
FIG. 3 is a front elevation view of the battery compartment of FIG. 2 with the rotary switch actuator shown rotated to an "on" position.

Turning now to FIGS. 2 and 3, the housing assembly 14 of the light mount 10 has a compact battery compartment or cavity 11. The light mount 10 can also include a rotary switch 12 for energizing the light source 46. The rotary switch 12 can be shifted or turned between an "off" position (FIG. 2) where the light 46 is de-energized and an "on" position (FIG. 3) where the light 46 is energized by a power source 16 to provide illumination. The rotary switch configuration described hereinafter is advantageous because it enables the light mount 10 to be sized not much larger than the battery 16 housed therein. In the illustrated form, the housing assembly 14 is sized and configured to house or contain the battery 16 therein. Preferably, the battery 16 is a thin, coin cell-type battery having a disc configuration. The housing assembly 14 includes opposing front and rear walls 17 and 18 and a narrow, generally annular outer wall 20 extending therebetween about the circumference of the generally circular perimeter of the walls 17 and 18. In one form, the housing assembly 14 includes the base portion 15 which is integral with the arms 104 and lenses 102 as previously described and a separate cover, where the base portion 15 includes the rear wall 18 and the outer wall 20 and the cover includes the front wall 17.

The front and rear walls 17, 18 and the outer wall 20 form the compact battery compartment 11 to hold the battery 16. Preferably, the entire mount 10 is approximately the same configuration and only slightly larger in size and thickness than the battery 16 itself so that the coin cell battery 16 fits snugly therein. To this end, the housing assembly 14 can have a thin depth or thickness as provided by the width of the annular wall 20 between the front and rear walls 17 and 18. With a coin cell battery, the thickness of the housing assembly 14 at the outer wall 20 and, therefore, the depth of the housing assembly 14 can be slightly larger than the annular side surface 22 of the battery 16. By way of example, the housing assembly 14 can be less than about 5 mm deep and, preferably, around about 3 mm. Additionally, the front and rear walls 17, 18 extend across respective, opposite flat main faces 24 of the coin cell battery 16 and have a diameter slightly larger than that of the coin cell battery to minimize the size or diameter of the housing assembly 14. Preferably, the perimeter of the housing assembly 14 is substantially circular to generally conform to the shape of the battery 16; however, the housing assembly 14 could take any suitable shape, including other regular and irregular polygons, curvilinear shapes, or combinations thereof.

The rotary switch 12 is advantageous because it enables the light mount 10 and housing assembly 14 thereof to retain a compact configuration sized not much larger than the coin cell battery 16 itself. The switch 12 includes a switch actuator 26 partially received within the battery compartment 11 and partially protruding out therefrom to be manipulated from outside the housing assembly 14 between an on position and an off position. The switch actuator 26 includes a grip actuator portion 28 that projects through a curved slot or track 30 in the housing outer wall 20 so that it only protrudes radially slightly beyond the outer wall 20 and is configured to be actuated by a user. To actuate the switch 12, the grip portion 28 provides a control knob of the switch 12 and is operable to be shifted circumferentially along the curved outer wall 20 in the track 30 formed therein. The outer grip portion 28 extends into the housing assembly 14 and connects to a battery retaining portion 34 of the switch actuator 26. The battery retaining portion 34 forms an arm member that has an arcuate configuration so as to at least partially encircle or extend around the annular side surface 22 of the battery 16. The arcuate arm member 34 is preferably of resilient material, such as plastic, and can have a radius slightly smaller than the radius of the battery annular surface 22 so that it grips tightly thereon. As illustrated, the battery retaining portion 34 extends circumferentially around more than half of the battery side surface 22 so that ends 37 of the battery retaining portion 34 are spaced apart a distance that is smaller than the battery diameter across the main surfaces 24 thereof.

So configured, the arm can be flexed outwardly to increase the radius of curvature thereof to be greater than the battery side surface 22 and then when the arm is released, the resiliency of the arm allows the arm to flex back toward its unflexed configuration for tightly engaging and gripping the battery side surface 22 so that the battery 16 is fixedly held by the switch actuator 26, such as by a press fit therebetween. An end section 36 of the battery retaining portion 34 tapers inwardly toward the battery 16 to form a narrow distal segment 38 with an outwardly facing contact abutment surface 40 that will be described in more detail below. So configured, as the grip portion 28 is shifted for rotary travel along the slot 30 in rotary direction A, the battery retaining portion 34 and the battery 16 are rotated or turned within the battery compartment 11 as illustrated by arrow B in FIG. 2.

The mount 10 includes the light source 46 contained in a pocket 49 formed in a small radially extending protrusion 48 at the bottom of the housing assembly 14. Preferably, the light source 46 is a thin, surface mount LED, but other types of light sources may also be used. As discussed above, the resilient arm members 104 connect the lenses 102 of the glasses 100 to the light mount 10. Specifically, the resilient arm members 104 extend upwardly from the upper corners 114 of the lenses 102 to connect to opposite sides 47 of the light protrusion 48 as shown in FIG. 1. In the illustrated form, the resilient arm members 104 connect to the side edges 47 of the protrusion 48 generally at an upwardly inclined angle to space a pivot point P of the resilient arm members 104 from the connection of the arms 104 to the mount 10, which effectively lowers the stress acting on the connection during flexure of the lenses 102 and use of the lighted glasses 10. As illustrated, the resilient arm members 104 each have a curved portion 117 that extends from the light protrusion or pocket 48 upwardly at an incline away from the central axis C to extend generally tangentially relative to the battery compartment 11 and then curve so that the arms 104 are generally convex between the protrusion side edges 47 and the lenses 102 to open inwardly toward the gap 113 (FIG. 1). The convex portion 117 resiliently flexes to allow the lenses 102 to be pulled generally apart and pivoted generally about the pivot point P to increase the size of the gap 113 for fitting around a user's nose. As described above, the arcuate portions 109 allow the gap 113 to be further increased in size when the lenses 102 are pulled apart and pivoted generally upwardly about respective pivot points P of the arcuate portions 117.

Turning back to FIGS. 2 and 3, the light source 46 includes two electrical contacts extending therefrom: an elongate face contact 42 and an elongate side contact 44. The face contact 42 is arranged to always be in electrical contact with the battery 16 by continuously engaging the flat face 24 of the battery 16, and the side contact 44 is arranged to selectively contact or selectively electrically engage the battery side surface 22 to selectively complete a circuit to energize the light source 46 depending on the position of the switch actuator 26. The face contact 42 extends from the light source 46, in this form a surface mount LED, along the rear wall 18 of the housing assembly 14 to extend along and in contact with the flat face 24 of the battery. The side contact 44, which can be a metallic spring strip or the like, extends from the light source 46 adjacent the outer wall 20 of the housing assembly 14 for engaging the battery side surface 22. Preferably, the side contact 44 is configured so that when in a neutral position, the side contact 44 extends into the battery compartment 11 so that it must be flexed outwardly to install the battery 16 therein. So configured, the side contact 44 is biased inwardly into engagement with the battery side surface 22. Specifically, by one approach, the side contact includes a curved portion 59 that is outwardly convex and extends from the light source 46 into the battery compartment generally along the outer wall 20.

As previously discussed, the battery 16 preferably is a coin cell battery with a positive face 25 that extends to the battery side surface 22 and a negative face 27 opposite the positive face 25. So configured, when the circuit is completed, the face contact 42 electrically engages the negative face of the battery and the side contact 44 electrically engages the positive side surface of the battery, which electrically connects the battery 16 and the light source 46 to thereby energize the light source 46.

The rotary switch 12 is shifted so that the narrow end segment 38 of the battery retaining portion 34 can be shifted to either block the side contact 44 from contacting the battery side surface 22 or to allow the side contact 44 to electrically contact the battery 16. In the off position of the rotary switch 12, the narrow segment 38 of the switch battery retaining portion 34 is shifted between the battery side surface 22 and the side contact 44 to space the side contact 44 from the side surface 22 of the battery 16, as shown in FIG. 2. In this position, a contact surface or bent portion 63 of the side contact 44 abuts the outwardly tapered surface 40 between the narrow end segment 38 and the adjacent wider portion 67 of the battery retaining portion 34 abuts an outwardly inclined cam surface 58 to act as a stop surface 55 of the switch 12.

So configured, rotation of the battery retaining portion 34 between the "on" position (FIG. 3) and the "off" position (FIG. 2) creates a camming action between the narrow segment 38 and the cam end portion 58 that transforms the rotational movement of the narrow segment 38 to linear or radial movement of the side contact 44 because as the narrow segment 38 slides along the outwardly inclined cam surface 58, the side contact 44 will be shifted generally radially outward away from the battery 16. As such, the side contact 44 is shifted from an electrical engagement position where the contact surface 63 engages the battery side surface 44 and a position with the contact surface 63 spaced therefrom. Because the switch 12, and at least the narrower segment 38 and/or the retaining portion 34, are constructed of a non-conductive material, e.g. plastic, the spaced side contact 44 is not in electrical communication with the battery 16 when the switch 12 is in the off condition.

Figure 2A:
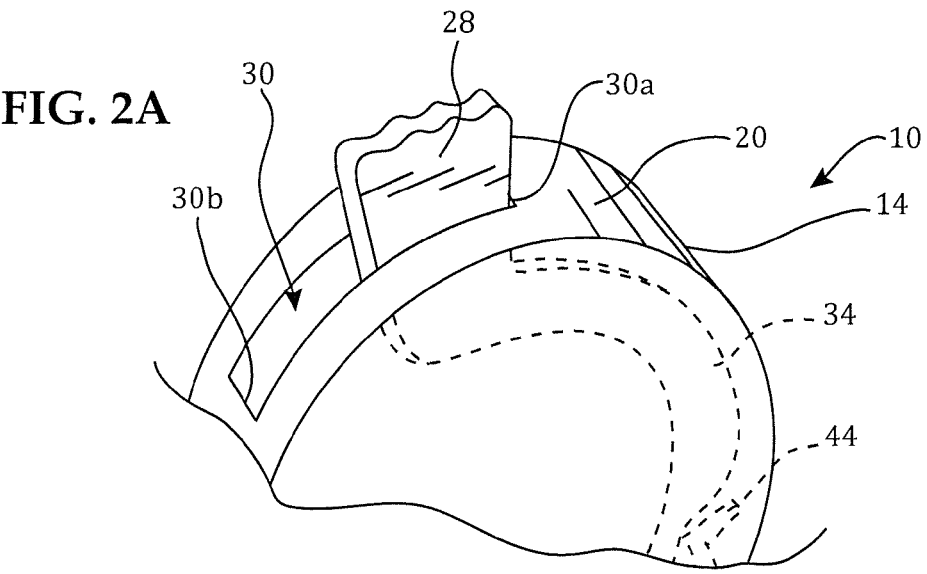
FIG. 2A is a perspective view of the battery and light housing of FIG. 2 showing an arcuate track through which a switch actuator projects.

Alternatively or additionally as shown in FIG. 2A, the track 30 is sized to stop or abut the grip portion 28 of the actuator 26 to stop shifting of the actuator 26 by limiting the length of the track 30 so that the transverse end surface 30a of the track 30 coincide with the grip portion 28 being positioned in the desired "off" position of the switch 12, which is illustrated, and the desired "on" position corresponding to the other transverse end surface 30b of the track 30.

When lighting is desired, a user grips the rotary switch 12 via the grip portion 28 and translates it along the track 30 to actuate the switch 12. This action turns or rotates the battery retaining portion 34 and the battery 16 held thereby within the housing assembly 14. As the battery retaining portion 34 and the battery 16 are rotated, the side contact 44 slides along the abutment surface 40 of the narrow segment 38 until the distal end 50 thereof is reached. At this point, continued rotation of the battery retaining portion 34 shifts the end 50 sufficiently so as to clear the bent contact surface 63 so that the inward biasing force of the side contact 44 allows the side contact 44 to radially shift or snap inwardly against the side surface 22 of the battery, as shown in FIG. 3. This completes the circuit between the light source 46 and the battery 16, thus providing power to the light source 46.

Figure 4:
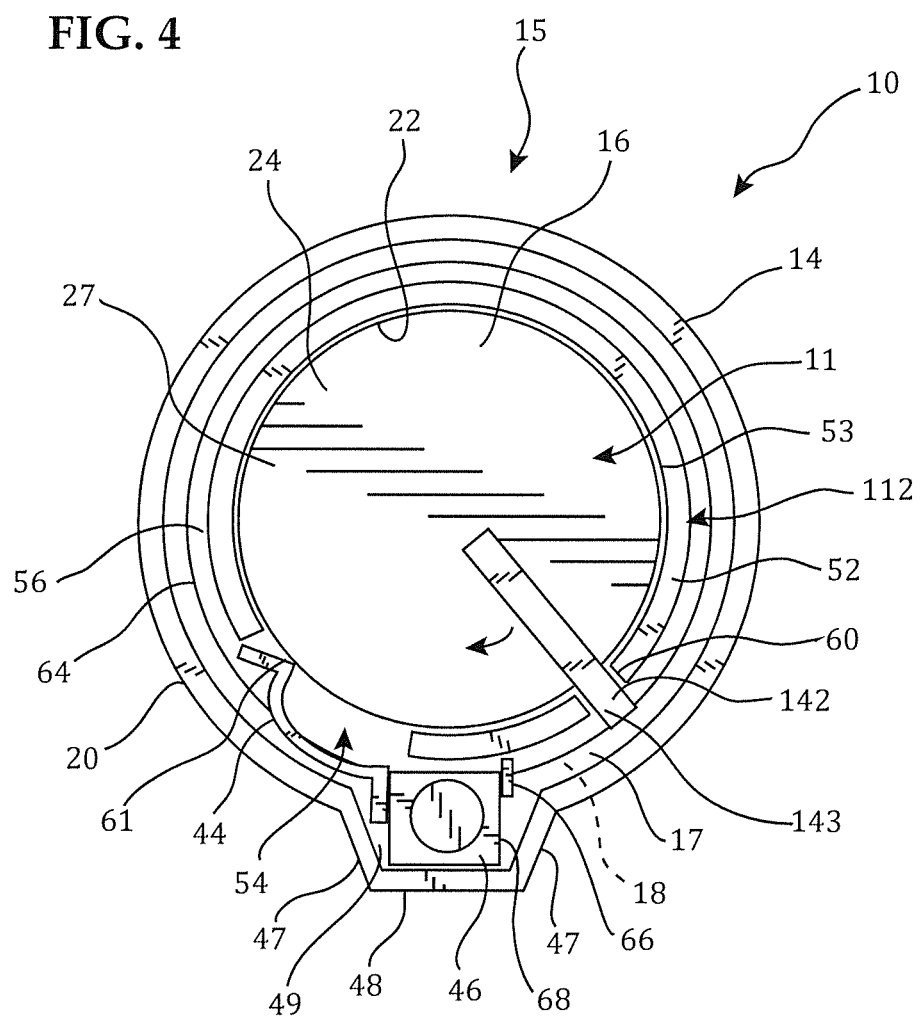
FIG. 4 is a front elevation view of an alternative battery and light housing showing a battery and light therein and a cover actuator of a rotary switch shown rotated to an "off" position.
Figure 5:
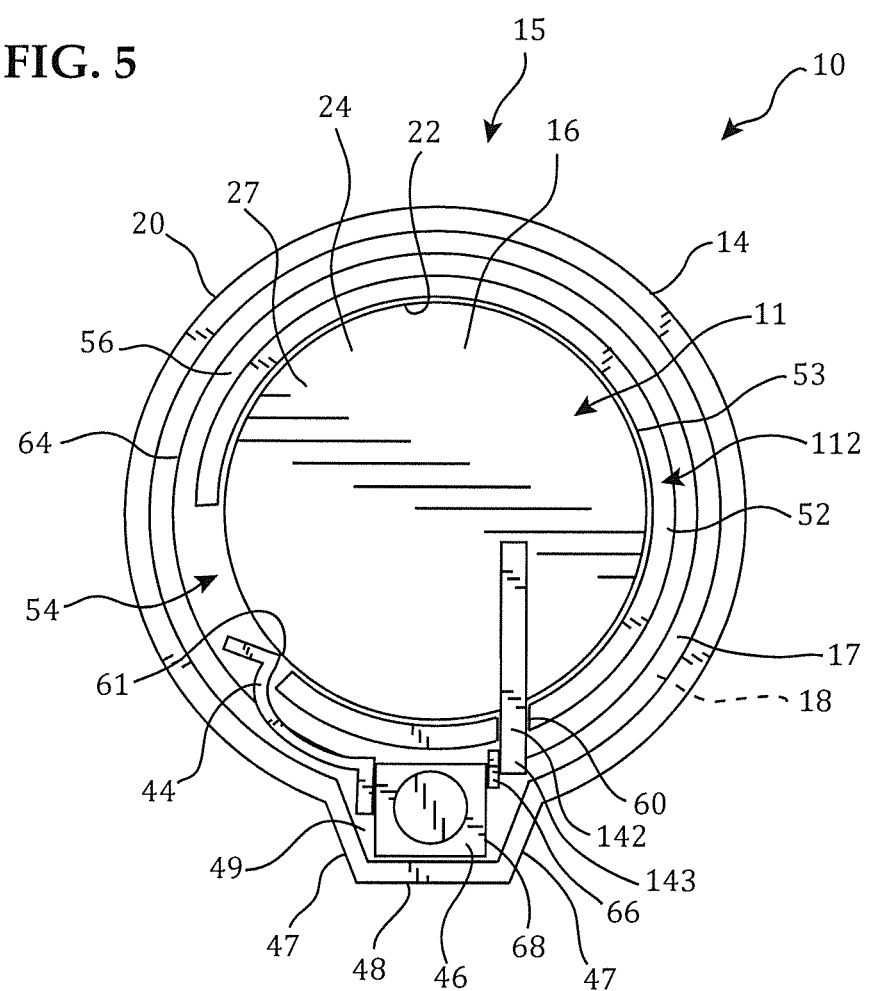
FIG. 5 is a front elevation view of the alternative battery and light housing of FIG. 4 with the cover actuator shown rotated to an "on" position.
Figure 6:
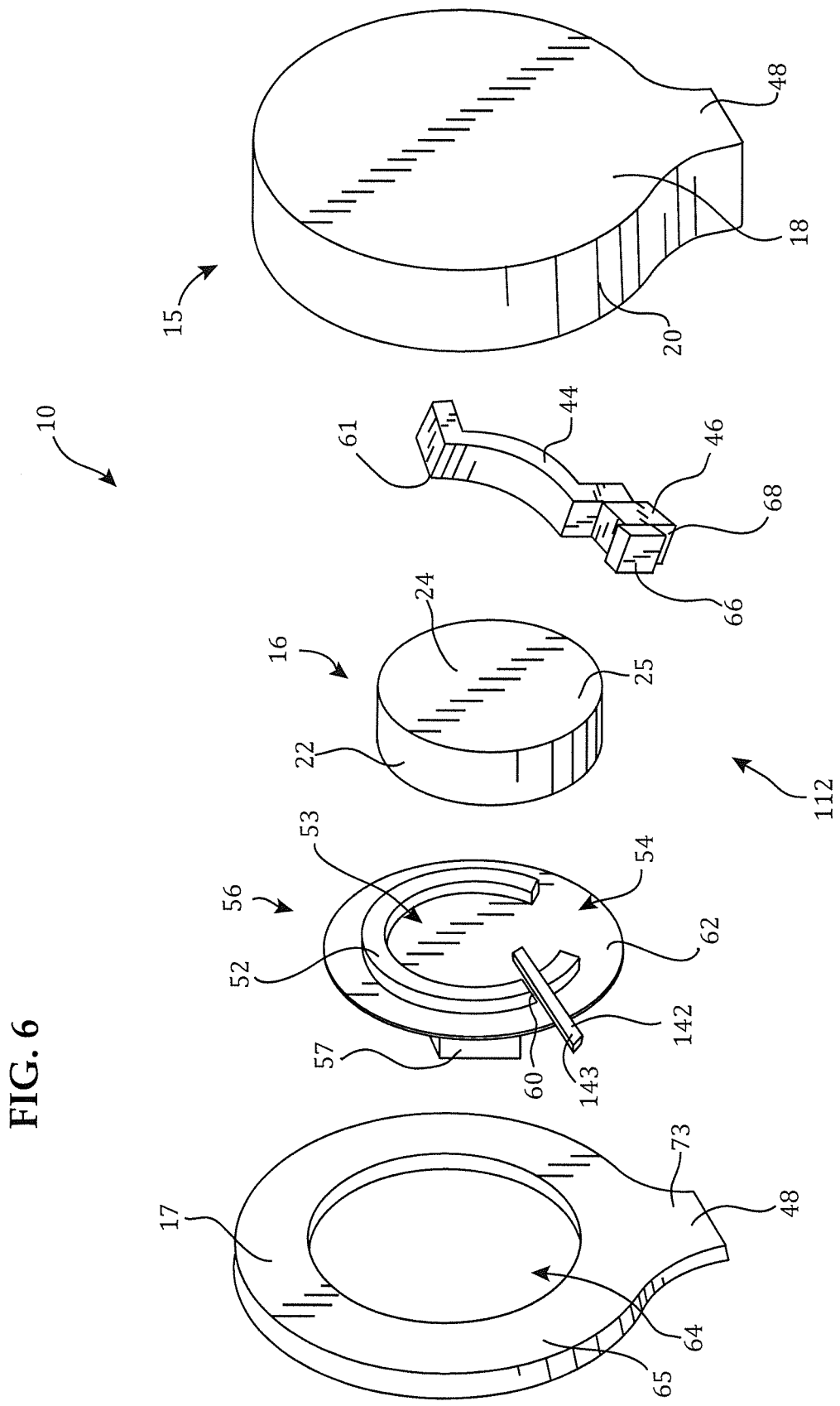
FIG. 6 is an exploded perspective view of the alternative battery and light housing of FIG. 4.

Another form of a rotary switch is illustrated in FIGS. 4-6. In this form, rotary switch 112 is configured to rotate both the battery 16 and a shiftable face elongate electrical contact 142 of conductive material to break or complete the electrical circuit. The housing assembly 14 includes the front and rear walls 17, 18 connected by the outer wall 20 similar to that already discussed above with FIGS. 2 and 3. In this form, however, the face contact 142 is separate from the light source 46 and is mounted to rotate with the switch 112 to be selectively connected to the battery 16, while the side contact 44 stays in continuous contact with the battery 16 to be in electrical communication therewith.

Turning to more of the details, the housing assembly 14 in this embodiment is similar to the previous housing, but includes a curved battery retaining wall 52 within the battery compartment 11 that extends between the housing front and rear walls 17, 18. The wall 52 is spaced radially inwardly from the housing outer wall 20 to form a battery pocket 53. The retaining wall 52 can be sized so that the battery 16 is tightly received and secured in the pocket 53, such as by a friction fit. In the illustrated form, the wall 52 has a generally circular configuration so that the pocket 53 generally conforms to the shape and size of the preferred coin cell type battery 16.

As shown, the retaining wall 52 includes a relatively large circumferential opening or gap 54 therein. The gap 54 is positioned to receive a bent contact portion 61 of the side contact 44. For example, the side contact 44, which can be a metallic spring strip or the like, extends from the light source 46 adjacent the outer wall 20 for engaging the battery side surface 22. Preferably, the mount 10 and the side contact 44 have the configuration described above, so that when in a neutral position, the side contact 44 extends into the housing assembly 14 so that it must be flexed outwardly to install the battery 16 therein. So configured, the side contact 44 is biased inwardly into engagement with the battery side surface 22.

The rotary switch 112 may also include a rotatable cover insert 56 on or within the front wall 17 configured to turn the light source 46 on and off by rotating the face contact 142 between "off" and "on" configurations (see FIGS. 4 and 5). To this end, the cover insert 56 can mount to and/or tightly receive the battery 16, via the battery retaining wall 52 as previously described. In the illustrated form, the retaining wall 52 extends circumferentially around more than half of the side surface 22 of the battery 16 to frictionally retain the battery 16 in the pocket 53 formed by the retaining wall 52. Preferably, the retaining wall 52 includes a relatively narrow gap or circumferential opening 60 therein for receipt of the face contact 142 therethrough. The face contact 142 extends inside the pocket 53 on to and in contact with one of the major faces of the battery 16. The elongate contact 142 extends through the wall opening 60 to have a small projection end portion 143 thereof that extends out of the battery pocket 53 and beyond the wall 52 to a position radially outward of the retaining wall 52. The face contact 142 may be fixedly secured to an interior surface 62 (FIG. 6) of the cover insert 56 by adhesive, snap-fit structure, ultrasonic welding, or the like. Thus, when the cover insert 56 is secured to the battery 16, one end of the face contact 142 engages and is always in electrical communication with one of the major faces 24 of the battery 16. As discussed in more detail below, the projection end portion 143 of the face contact 142 is configured to selectively electrically engage the light source 46 depending on the position of the rotary switch 112. In this embodiment, the rotary switch 112 is activated by turning the cover insert 56 to move the projection end portion 143 of the contact 142 into and out of electrical communication with the light source 46.

The front wall 17 preferably is detachable from the side wall 20 to provide access to the interior of the housing assembly 14. As discussed above, the cover insert 56 is rotatable with respect to the other portions of the housing assembly 14. Accordingly, by one approach, the front wall 17 can include an outer annular rim 65 defining and extending about a generally centrally located circular opening 64 that is sized to rotatably receive the cover insert 56 therein. Preferably, the cover insert 56 is rotatably mounted to the front wall 17, such as by tongue-and-groove structure or the like, so that the cover insert 56 secures the battery 16 within the housing assembly 14. With this configuration, the cover insert 56, and therefore the battery 16 and the face contact 142 both fixedly carried thereby, can be rotated within the housing assembly 14 between off and on positions. The cover insert 56 of this form may further include an outwardly projecting handle or protrusion 57 (FIG. 6) to provide a user of the rotary switch 112 with an easy grip device.

Figure 8:
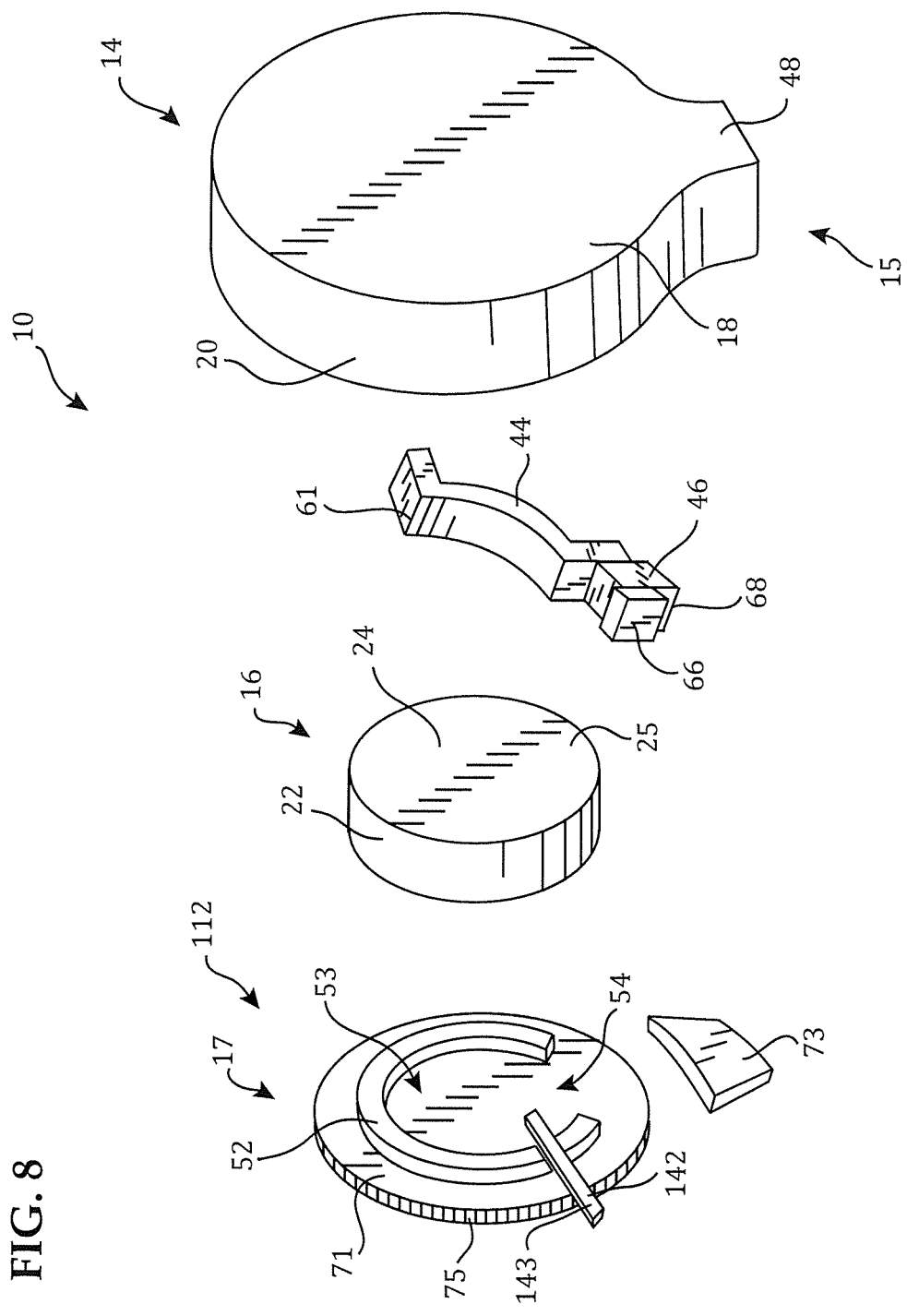
FIG. 8 is an exploded perspective view of a second alternative battery and light housing.

By another approach as shown in FIG. 8, the front wall 17 is divided into a generally annular rotatable portion 71 and a lower portion 73. In this form, the rotatable portion 71 performs the function of the cover insert 56, as described above, and the lower portion 73 is separately attached to the wall 20 to cover the light protrusion 48 of the housing assembly 14. The rotatable portion 71 can be rotatably attached to the outer wall 20 such as by tongue-and-groove structure to rotate therein and can include undulations or ribs 75, or the like on an outer portion or surface thereof to provide a gripping surface for a user of the rotary switch 112 when rotating the cover insert 56 between the on and off positions (not shown).

The light source 46 is preferably a low profile surface mount LED and includes the elongate side contact 44 extending outwardly therefrom and a secondary, shorter abutment contact 66 extending from a side edge 68 of the light source 46. The LED 66 is mounted in the housing assembly 14 so that the contact 66 is spaced from the battery 16 and is in the rotational path of the outwardly projecting contact end portion 143 of the elongate face contact 142 secured to the rotatable cover insert 56. So configured, the light mount 10 of this form can be switched to an off position, as shown in FIG. 4, where the cover insert 56 is turned or rotationally positioned so that the end contact portion 143 of the face contact 142 is circumferentially spaced from the LED contact 66 so it is not in contact with, abutting, and/or in electrical communication with the abutment contact 66. When lighting is desired, a user turns or rotates the cover insert 56 to the on position, as shown in FIG. 5, where the end portion 143 of the face contact 142 electrically contacts, abuts, or is otherwise in electrical communication with the abutment contact 66. This completes a circuit between the light source 46 and the battery 16 to power the light source 46 and provide illumination to a viewing or reading area forwardly of a wearer of the glasses 100. The larger opening 54 in the battery retaining wall 52 can be circumferentially sized large enough so that turning the cover between "on" and "off" positions does not require ends of the retaining wall 52 on either side of the larger opening 54 to engage the side contact 44.

The light mount 10 and its associated rotary switch 12, 112 are shown with templeless nose-clamp glasses 100 without temple arm members; however, the light mount 10 discussed herein can be used with other lighted objects, such as headgear, traditional glasses, clip-on lights, or even stand alone hand held lighting modules. Additionally, the rotary switch 12, 112 may include structure or a mechanism to retain the switch 12, 112 in the on or off positions, such as detents formed with protrusions, stops, resilient flanges, a latch, a friction fit, or like structures.

Figure 7:
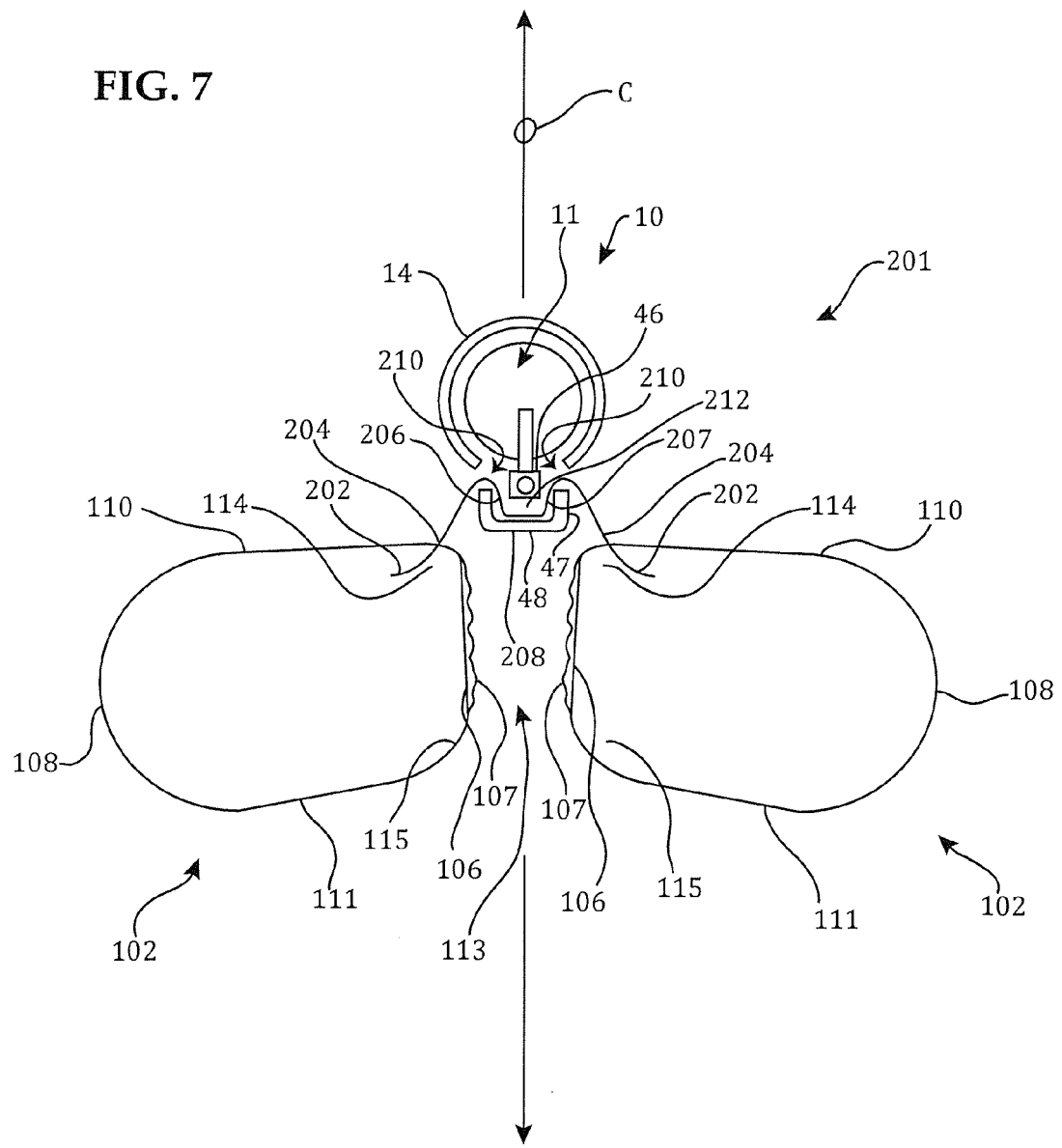
FIG. 7 is a front elevation view of alternative lighted nose clamp glasses including a light mount.

Another form of nose-clamp glasses 201 is shown in FIG. 7. Similar to the glasses 100 described above, the glasses 1000 include the lenses 102 connected to the centrally located light mount 10 having the battery compartment 11 and the light source 46. The lighted glasses 1000 may use either switch 12 or 112 to energize the light source 46, as described above.

In this form, the lenses 102 are attached to the light mount 10 with a separate resilient arm member 200, such as a segment or strip of spring steel or other resilient material, which may be separate from the lenses 102 and/or the mount 10. The resilient arm member attaches both lenses to the light mount 10 and resiliently flexes to allow the lenses 102 to be pulled generally apart for mounting to a user's nose. In addition, the light mount is preferably disposed above and intermediate of the lenses 102 so as to be centered along the central axis C extending between the lenses 102 and centrally through the light mount 10.

In the illustrated form, distal ends 202 of the biased arm member 200 are embedded or otherwise secured to the upper corners 114 of the lenses 102. Arcuate portions 204 of the biased arm 200 extend away from the lens upper corners 114 towards the light mount 10 in an outwardly convex path. The arcuate portions 204 extend to opposite side edges 47 of the protrusion 48 housing the light source 46. A central segment 206 of the biased arm 200 connects the arcuate portions 204 and extends through the light mount 10 to mount the lenses 102 to the light mount 10. By one approach, the central segment 206 includes a depending cup or concave portion 207 that extends through the protrusion 48 and at least partially wraps around the light source 46, such as around a bottom portion 208 of the light source 46 adjacent the outer wall 20. The curved shape and resilient material of the arm 200 biases the lenses 102 inwardly toward each other similar to the previous embodiments so that the lenses 102 can be clamped to a wearer's nose.

Turning now to more details of the arm 200 as shown in FIG. 7, the arm 200 extends through slots or openings 210 provided in the housing assembly 14 and specifically, the side edges 47 of the protrusion 48, the battery compartment 11, or at a connection between the protrusion 48 and the battery compartment 11. The concave portion 207 of the arm 200 is mounted in a cavity 212 below and to the sides of the light source 46 and is generally complementary to the outer wall 20 forming the sides of the protrusion 48. So configured, the arm 200 is secured to the housing assembly 14 of the light mount 10 to attach the lenses 102 to the mount 10. By one approach, the protrusion 48 may further include retention walls or protuberances, adhesive, or the like to further secure the arm 200 therein.

Figure 9:
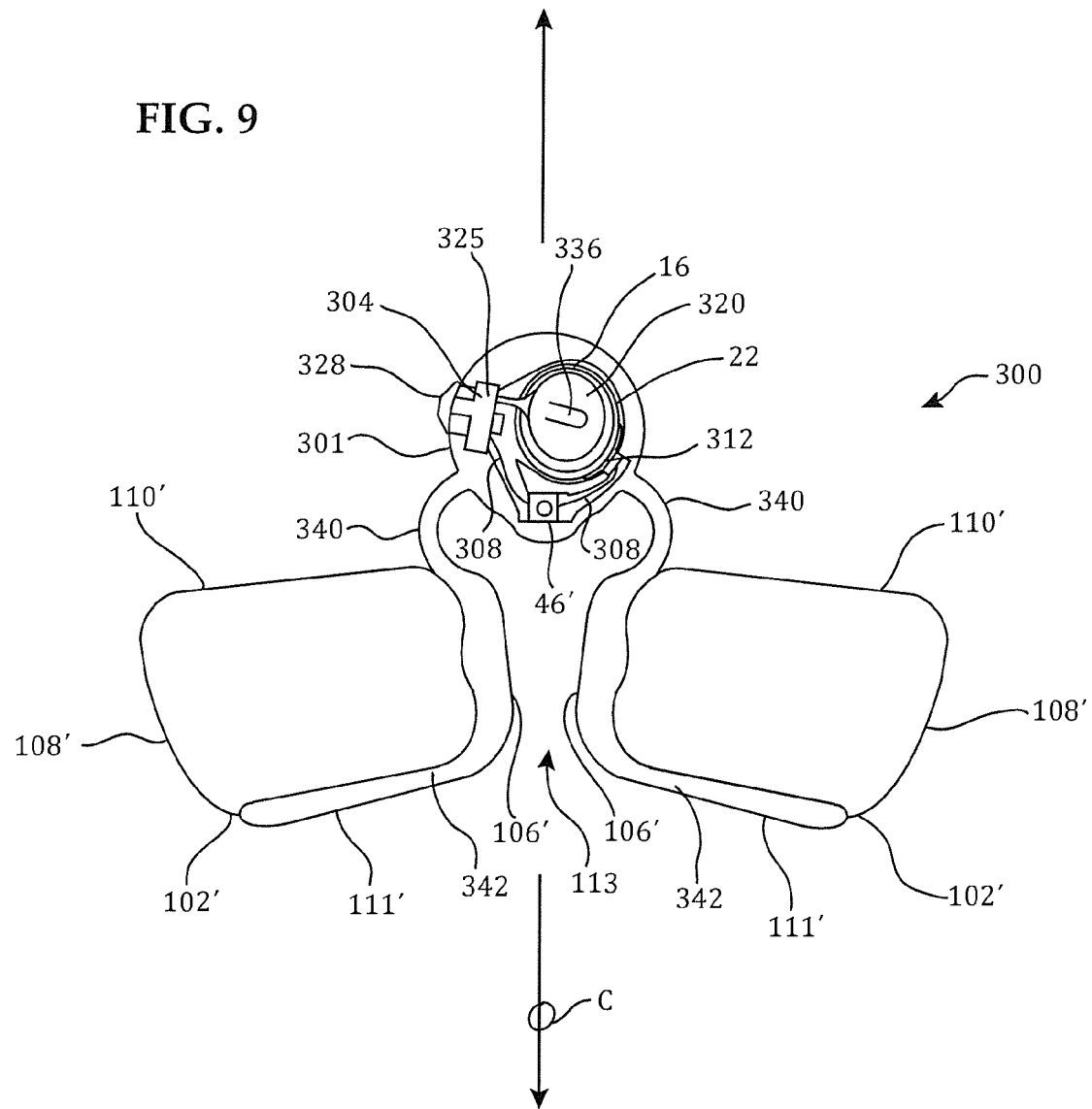
FIG. 9 is a front elevation view of alternative lighted nose clamp glasses having lenses and a centrally located light mount for the light components including a slide switch.
Figure 10:
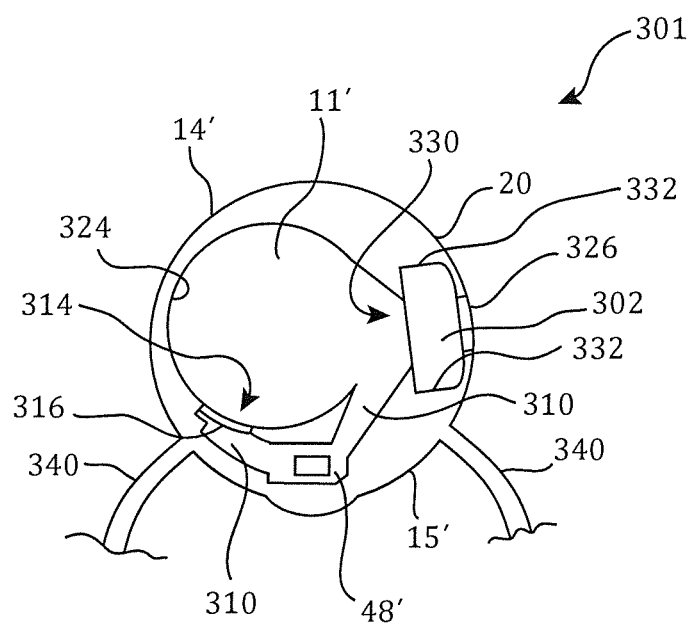
FIG. 10 is a front elevation view of a battery and light housing of the lighted nose clamp glasses of FIG. 9 showing battery, light, and switch compartments with connecting channels therebetween.
Figure 11:
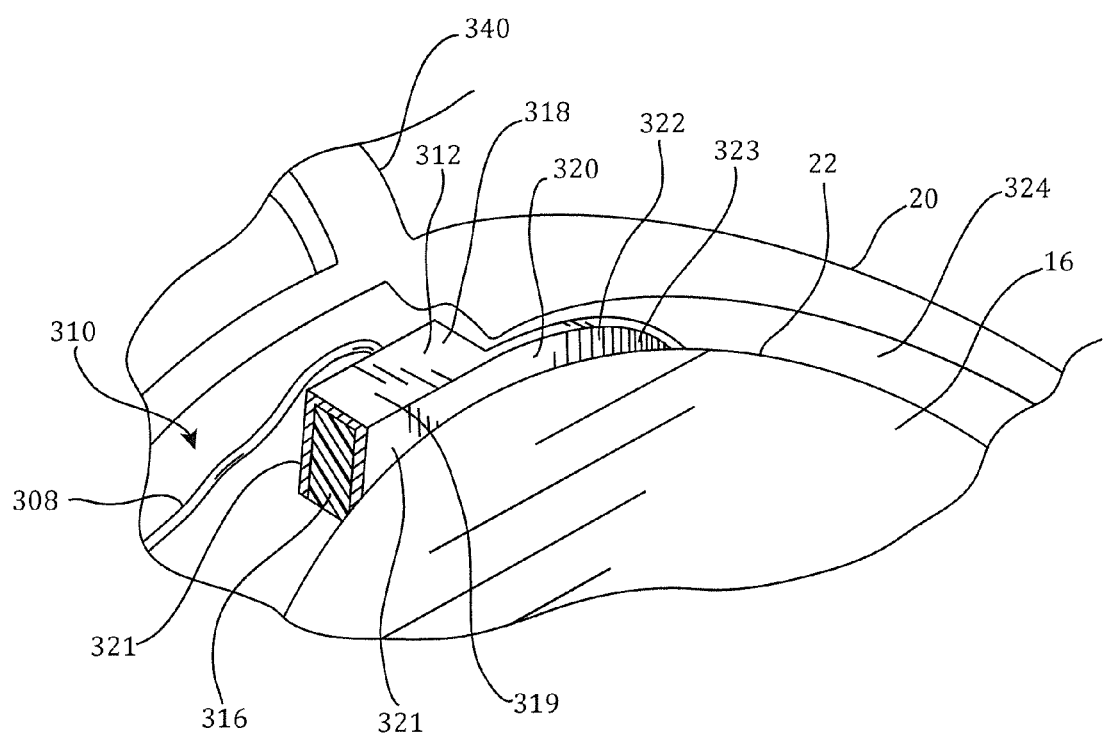
FIG. 11 is a sectional perspective view of the light mount of FIG. 9 showing a battery side contact mounted on a wall of the light mount in engagement with a battery.

An alternative form of the lighted glasses 300 is shown in FIGS. 9-11. The glasses 300 have similar components to that of the previously described glasses 100 such that similar compartments will be provided with the same reference numbers but with a prime added thereto. The glasses 300 include a generally centrally disposed light mount 301 including housing assembly 14' with battery compartment 11', the light compartment 48', and, in this form, a switch compartment 302. Instead of a rotary switch having a configuration as set forth above, the lighted glasses 300 include a slide switch 304 received within the switch compartment 302. The slide switch 304 minimizes the moving parts within the light mount 301 and allows for contacts of the battery 16 and of the light source 46' to remain fixed in the housing assembly 14' during operation of the switch 304. The switch 304 can alternatively be a conventional rotary switch or a pushbutton switch. In FIG. 9, much of the internal structure of the light mount 301 is removed to more clearly show the electrical components, while in FIG. 10, much of the electrical components are removed to more clearly show in the structure of the light mount 301.

As shown in FIG. 10, the light source 46' received within the light compartment 48' has two leads 308 extending therefrom that are disposed within narrow channels or recesses 310 connecting the light compartment with the battery compartment 11' and the switch compartment 302. Preferably, the light compartment 48' is sized along the C-axis to be only slightly larger than a corresponding dimension of the light source 46' along the C-axis so that the light source 46' is restricted from shifting along the C-axis. As shown, the light compartment 48' can have a larger width than the light source 46' to accommodate the electrical connection of the leads 308, as by soldering to the opposite lateral sides of the light source 46', which can be a generally rectangular or square surface mount LED.

One of the leads 308 extends between the light compartment 48' and the battery compartment 11' to electrically couple the light source 46' in the light compartment 48' with the battery 16 via a conductive battery side contact 312 connected to the lead 308. In this regard, the battery 16 can be a coin-cell battery having disc-shape with an annular side wall 22, and the side contact 312 is configured to be fixed in the housing assembly 14' in engagement and electrical contact with the battery sidewall 22. A wall 316 extends across an end 314 of the channel 310 connecting the channel 310 to the battery compartment 11'. The wall 316 has a height less than the depth of the light mount base portion 15' so that there is space above the wall 316 with the cover mounted on the base portion 15' to form an upper mouth opening 315 from the channel 310 to the battery compartment 11'. The cover can be either the previously-described front wall 17 or rear wall 18 of the light mount 301 depending on the desired configuration. So configured, the wall 316 can be utilized to mount the side contact 312 in a substantially fixed position to avoid undesired movement that may impede or obstruct electrical coupling with the side surface 22 of the battery 16.

Specifically, the side contact 312 includes a generally U-shaped mounting or clip portion 318 that is sized and configured to fit over the wall 316 as by a friction fit therewith and a distal contact portion 320 that is configured to engage the battery side surface 22. Preferably, the U-shaped clip portion 318 has an upper bridge portion 319 that generally spans the width of the wall 316 so that depending leg portions 321 are frictionally fit against the sides of the wall 316 (see FIG. 11). In this manner, shifting of the contact 312 is avoided during operation of the switch 304. As illustrated, the distal contact portion 320 includes a distal, arcuate or bent arm 322 that is configured to extend laterally along an arcuate sidewall 324 of the battery compartment 11'. End portions 323 of the arm 322 can be bent inward to project into the battery compartment 11', so that with insertion of the battery 16 into the compartment, the battery 16 deforms the arm portions 323 outwardly so that the arm portions are biased into frictional engagement with the battery side surface 22. Alternatively, the arm 322 can have a radius of curvature that is less than a corresponding radius of curvature of the battery compartment sidewall 324 so that the arm 322 similarly deflects with insertion of the battery 16 into the compartment.

The other of the leads 308 runs in and along the other channel 310 to electrically connect the light source 46' in the light compartment 48' to the slide switch 304 disposed in the switch compartment 302. The switch compartment 302 can have wall surfaces extending thereabout oriented for tightly engaging the housing or body 325 of the switch 304, such as by a friction or snap fit, so that the switch 304 does not undesirably shift during actuation thereof. The outer wall 20' includes an actuator opening 326 that extends through the wall 20' to the switch compartment 302. The opening 326 is elongated to be a slot opening that has a length sized sufficiently for actuation of the slide switch 304 with sliding of a switch actuator 328 thereof to either end of the slot opening 326. Alternatively, if a pushbutton switch or rotary switch is used, the size of the opening 326 could be adjusted accordingly.

On the opposite, radially inner side of the switch compartment 302, the compartment 302 includes an opening 330 that opens inwardly to the channel 310 extending from the light compartment 48' and to the battery compartment 11'. So configured, the lead 308 extends through the channel 310 to electrically couple the light source 46' to the switch 304. The switch compartment 302 wall surfaces can include a pair of opposite U-shaped surfaces 331 that cooperate to form the opposite outer and inner openings 326, 330 that are configured to tightly engage the generally rectangular switch body 325.

A battery face contact 334 electrically connects the switch 304 to the battery 16 by extending through the switch compartment opening 330 into the battery compartment 11'. In order to ensure that the face 24 of the battery 16 is electrically coupled or connected to the contact 334, the face contact 334 can be provided with an enlarged head 335 at its free end that is generally circular and which has a diameter so that it covers and engages a majority of the battery face 24. Moreover, a tab 336 can be cut from or separately connected to the head 335 of the face contact 334 that projects upwardly from the contact head toward the battery 16. When the cover is secured to the base portion 15', the battery 16 and tab 336 will be forced together with the tab 336 deflecting so that the tab 336 is biased into engagement with the battery face 24.

Turning now to more details of the glasses 300, as shown in FIG. 9, the light mount 301 is connected to the lenses 102' by alternative resilient arms 340. As shown, the arms 340 are arcuate along their entire length, and preferably have a generally consistent or constant curvature. The arms 340 function similarly to those discussed above, allowing the lenses 102' to be resiliently drawn away from one another to increase the gap 113 therebetween for placement on a wearer's nose. The arms 340 extend from the lens upper, interior corner portions 114 to connect to the light mount outer wall 20'.

Moreover, an alternative shape for the lenses 102' is shown in FIG. 9. As illustrated, each lens 102' includes a downwardly sloped outer edge 108' extending between the top and bottom edges 110', 111'. Additionally, each lens 102' includes a thickened portion 342 along the inner engagement edge 106 from the arms 340 and along at least a portion of the bottom edge 111'. The thickened portion 342 provides more surface area to more comfortably engage a wearer's nose and strengthens the lenses against breakage.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

The invention claimed is:

1. Lighted glasses comprising:
a pair of lenses each having a thin profile;
a light assembly comprising a power source, a switch, and a light source;
a light mount configured to receive the light assembly; and
a pair of resilient arms connecting the pair of lenses to the light mount, the arms configured to resiliently flex so that the pair of lenses can be generally pulled apart for fitting on a person's nose with the light mount and resilient arms each having a thin profile similar to that of the pair of lenses and being arranged and configured so that the lenses, the light mount and the resilient arms have a generally planar configuration for fitting in a thin profile receptacle.

2. The lighted glasses of claim 1 wherein the resilient arms are at least partially arcuate.

3. The lighted glasses of claim 1 wherein the light source comprises a surface mount light emitting diode.

4. The lighted glasses of claim 1 wherein the light mount comprises a base portion and a removable cover portion.

5. The lighted glasses of claim 1 wherein the switch comprises a slide switch.

6. The lighted glasses of claim 5 wherein the light mount further comprises a power source compartment for receiving the power source therein, a switch compartment for receiving the slide switch, a light source compartment for receiving the light source, and channels interconnecting the light source compartment to the power source compartment and the switch compartment.

7. The lighted glasses of claim 6 wherein the light mount further comprises a side contact and a face contact configured to electrically engage a power source inserted into the power source compartment, and the light source comprises a pair of leads, one of the leads connecting the light source to the side contact along one of the channels and the other of the leads connecting the light source to the switch along the other of the channels.

8. The lighted glasses of claim 1 wherein the light mount comprises an outer wall having an opening therein, and the switch comprises an actuator extending through the opening in the light module outer wall for actuation by a user.

9. The lighted glasses of claim 1 wherein the pair of resilient arms comprise a strip of spring steel extending through the light module and connected to the pair of lenses at distal ends thereof.

10. The lighted glasses of claim 1 wherein the light mount is positioned above and centrally between the pair of lenses.

11. Lighted glasses comprising:
a pair of lenses;
a light assembly comprising a power source, a switch, and a light source;
a light mount configured to receive the light assembly; and
a pair of resilient arms connecting the pair of lenses to the light mount, the arms configured to resiliently flex so that the pair of lenses can be generally pulled apart for fitting on a person's nose, wherein the light mount comprises a base portion and a removable cover portion, and the lenses, the resilient arms, and the light mount base portion are integral with one another.

12. Lighted glasses comprising:
a pair of lenses;
a light assembly comprising a power source, a switch, and a light source;
a light mount configured to receive the light assembly; and
a pair of resilient arms connecting the pair of lenses to the light mount, the arms configured to resiliently flex so that the pair of lenses can be generally pulled apart for fitting on a person's nose, wherein the switch comprises a slide switch, the light mount comprises a power source compartment for receiving the power source therein, a switch compartment for receiving the slide switch, a light source compartment for receiving the light source, and channels interconnecting the light source compartment to the power source compartment and the switch compartment, the light mount further comprises a side contact and a face contact configured to electrically engage a power source inserted into the power source compartment, and the light source comprises a pair of leads, one of the leads connecting the light source to the side contact along one of the channels and the other of the leads connecting the light source to the switch along the other of the channels, and
wherein the light mount comprises an upstanding wall extending across an end portion of the channel connecting the light source compartment and the power source compartment, and the side contact comprises a generally U-shaped mounting portion configured to fit over the upstanding wall.

13. Lighted glasses comprising:
a pair of lenses;
a light assembly comprising a power source, a switch, and a light source;
a light mount configured to receive the light assembly; and
a pair of resilient arms connecting the pair of lenses to the light mount, the arms configured to resiliently flex so that the pair of lenses can be generally pulled apart for fitting on a person's nose, wherein the switch comprises a rotary switch.

14. The lighted glasses of claim 13 wherein the rotary switch comprises an arcuate arm portion configured to grip a side surface of a battery disposed within the power source compartment, and rotation of the arcuate arm controls operation of the light source.

15. The lighted glasses of claim 13 wherein the light mount comprises a base portion and a rotatable cover portion having an arcuate wall configured to project into the power source compartment with placement of the cover portion on the base portion for at least partially surrounding a battery disposed within the power source compartment, and the cover portion further comprises a face contact configured to electrically couple a face surface of the battery to the light source with rotation of the cover portion.

* * * * *